United States Patent
Choi et al.

(10) Patent No.: US 10,567,046 B2
(45) Date of Patent: Feb. 18, 2020

(54) METHOD AND DEVICE FOR TRANSMITTING TRAINING FIELD IN WIRELESS LAN

(71) Applicant: LG ELECTRONICS INC., Seoul (KR)

(72) Inventors: Jinsoo Choi, Seoul (KR); Kilbom Lee, Seoul (KR); Wookbong Lee, Seoul (KR); Hangyu Cho, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 371 days.

(21) Appl. No.: 15/508,344

(22) PCT Filed: Aug. 6, 2015

(86) PCT No.: PCT/KR2015/008226
§ 371 (c)(1),
(2) Date: Mar. 2, 2017

(87) PCT Pub. No.: WO2016/036016
PCT Pub. Date: Mar. 10, 2016

(65) Prior Publication Data
US 2017/0302343 A1    Oct. 19, 2017

Related U.S. Application Data

(60) Provisional application No. 62/045,017, filed on Sep. 3, 2014.

(51) Int. Cl.
*H04B 7/0452*    (2017.01)
*H04L 5/00*    (2006.01)
*H04L 27/26*    (2006.01)

(52) U.S. Cl.
CPC ......... *H04B 7/0452* (2013.01); *H04L 5/0007* (2013.01); *H04L 27/2628* (2013.01)

(58) Field of Classification Search
CPC ..... H04B 7/0452; H04L 5/0007; H04L 27/26; H04L 27/2628
See application file for complete search history.

(56) References Cited

U.S. PATENT DOCUMENTS 9,088,504 B2 *    7/2015    Yang ...................... H04L 41/16
9,628,310 B2 *    4/2017    Lee ..................... H04L 27/2613
(Continued)

FOREIGN PATENT DOCUMENTS

KR    10-2012-0055622 A    5/2012
KR    10-2013-0117883 A    10/2013
(Continued)

*Primary Examiner* — Ian N Moore
*Assistant Examiner* — Rushil Parimal Sampat
(74) *Attorney, Agent, or Firm* — Birch, Stewart, Kolasch & Birch, LLP

(57) ABSTRACT

A method and device for transmitting a training field in a wireless LAN are disclosed. The method for transmitting a training field in a wireless LAN may include the steps of generating PPDUs to be respectively transmitted to a plurality of STAs by an AP, and respectively transmitting the PPDUs by the AP to the plurality of STAS respectively through a plurality of sub bands on an OFDMA-based overlapped time resource, wherein the PPDU may include the training field, the training field may be generated based on a training sequence, and the training sequence may be designed so that a non-null tone for AGC is included in a plurality of tone that corresponds to the plurality of sub bands, respectively.

6 Claims, 10 Drawing Sheets

(56) References Cited

U.S. PATENT DOCUMENTS

2012/0269124 A1* 10/2012 Porat ................. H04W 72/1231
　　　　　　　　　　　　　　　　　　　　　　　370/328
2012/0269125 A1　 10/2012　Porat et al.
2012/0327915 A1　 12/2012　Kang et al.
2013/0286959 A1　 10/2013　Lou et al.
2014/0140311 A1　　5/2014　Lee et al.
2014/0211775 A1* 　7/2014　Sampath ............... H04W 28/06
　　　　　　　　　　　　　　　　　　　　　　　370/338

FOREIGN PATENT DOCUMENTS

| KR | 10-1317570 B1 | 10/2013 |
| WO | WO 2011/031058 A2 | 3/2011 |
| WO | WO 2013/033231 A2 | 3/2013 |
| WO | WO 2013/155097 A1 | 10/2013 |

* cited by examiner

DL MU PPDU

METHOD AND DEVICE FOR TRANSMITTING TRAINING FIELD IN WIRELESS LAN

CROSS REFERENCE TO RELATED APPLICATIONS

This application is the National Phase of PCT International Application No. PCT/KR2015/008226, filed on Aug. 6, 2015, which claims priority under 35 U.S.C. 119(e) to U.S. Provisional Application No. 62/045,017 filed on Sep. 3, 2014, all of which are hereby expressly incorporated by reference into the present application.

BACKGROUND OF THE INVENTION

Field of the Invention

The present invention relates to wireless communication and, most particularly, to a method and device for transmitting a training field within a physical protocol data unit (PPDU) in a wireless LAN.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

Technical Objects

An object of the present invention is to provide a method for transmitting a training field in a wireless LAN.

Another object of the present invention is to provide a device for transmitting a training field in a wireless LAN.

Technical Solutions

In order to achieve the above-described technical object of the present invention, according to an aspect of the present invention, a method for transmitting a training field in a wireless LAN may include the steps of generating, by an access point (AP), a physical protocol data unit (PPDU) that is to be transmitted to each of a plurality of stations (STAs), and transmitting, by the AP, the PPDU to each of the plurality of stations (STAs) through each of the plurality of subbands within an overlapped time resource based on orthogonal frequency division multiple access (OFDMA), wherein the PPDU may include a training field, wherein the training field may be generated based on a training sequence, and wherein the training sequence may be designed so that non-null tones for automatic gain control (AGC) are included in a plurality of tones corresponding to each of the plurality of subbands.

In order to achieve the above-described technical object of the present invention, according to another aspect of the present invention, an access point (AP) allocating wireless resources in a wireless LAN may include a radio frequency (RF) unit transmitting and/or receiving radio signals, and a processor being operatively connected to the RF unit, wherein the processor may be configured to generate a physical protocol data unit (PPDU) that is to be transmitted to each of a plurality of stations (STAs), and to transmit the PPDU to each of the plurality of stations (STAs) through each of the plurality of subbands within an overlapped time resource based on orthogonal frequency division multiple access (OFDMA), wherein the PPDU may include a training field, wherein the training field may be generated based on a training sequence, and wherein the training sequence may be designed so that non-null tones for automatic gain control (AGC) are included in a plurality of tones corresponding to each of the plurality of subbands.

Effects of the Invention

By newly designing a training field that is included in a physical protocol data unit (PPDU) header, synchronization, channel tracking/estimation, and automatic gain control (AGC) may be enhanced.

DESCRIPTION OF EXEMPLARY EMBODIMENTS

Figure 1:
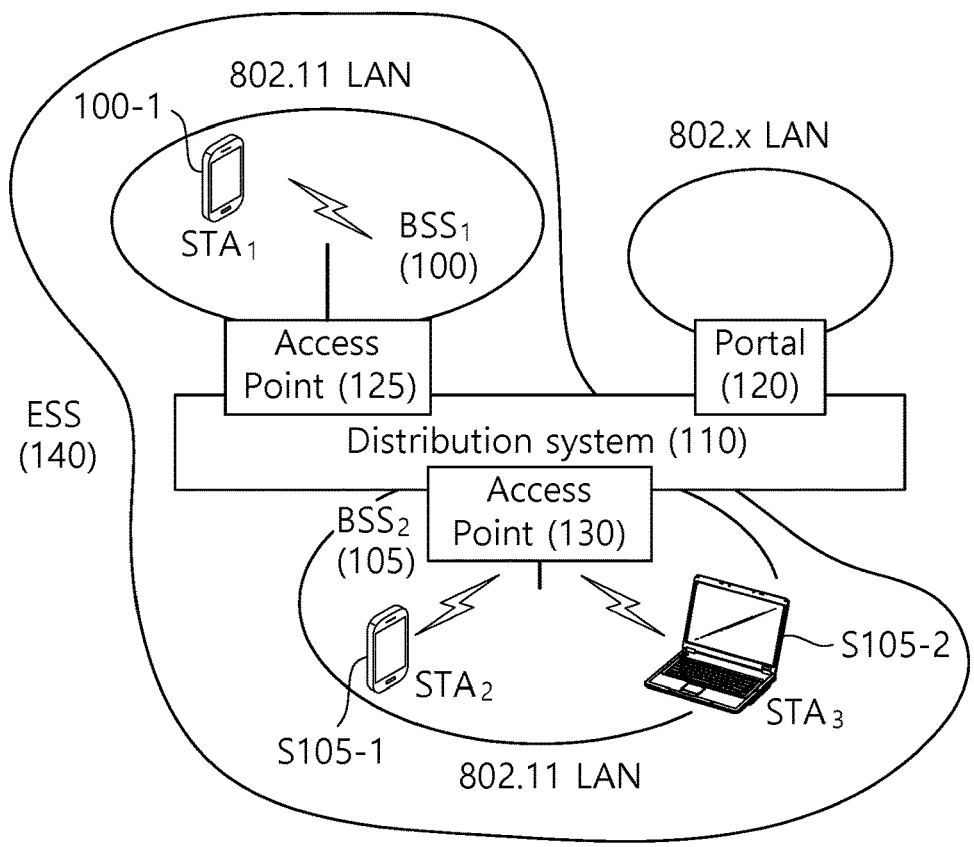
FIG. 1 is a conceptual view illustrating the structure of a wireless local area network (WLAN).
Figure 1:
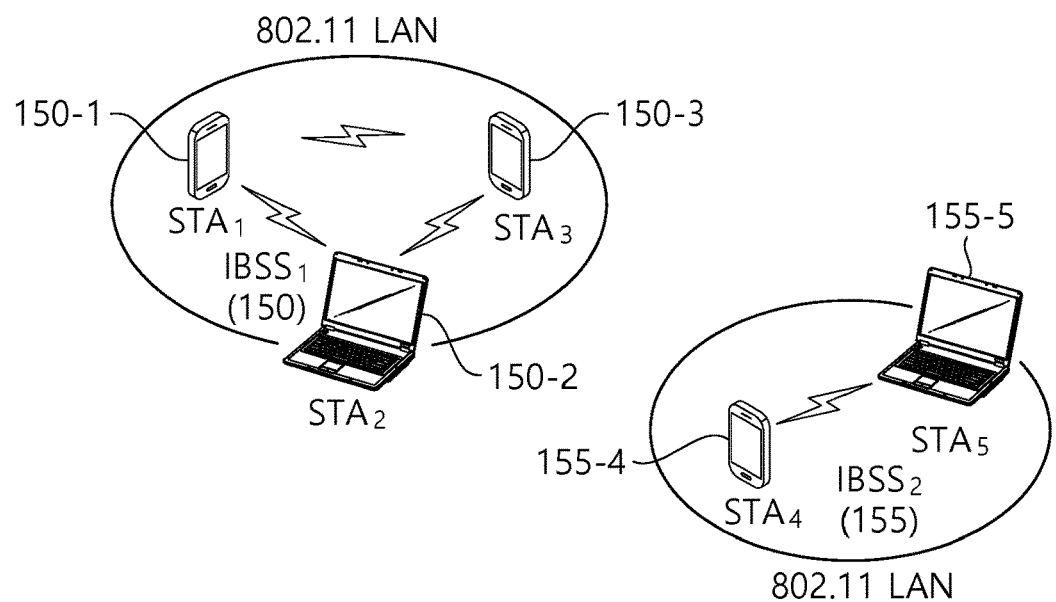

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

The definition of a new physical protocol data unit (PPDU) format and a new frame format for a next generation wireless LAN, which can satisfy the request for high throughput and enhanced quality of experience (QoE) performance, is being required. A new design for a header of a PPDU is required for an enhanced performance of a wireless LAN that is based on the new PPDU format. The PPDU may include a PPDU header and a MAC protocol data unit (MPDU) (or payload, physical service data unit (PSDU)).

Among the preamble part included in the PPDU header, the exemplary embodiment of the present invention discloses a design of a training field (e.g., short training field (STF)), which is used for synchronization, channel tracking/channel estimation, and automatic gain control (AGC). The design (or architecture) of such training field may significantly influence the performance of the entire wireless LAN system.

In the next generation wireless LAN system, an orthogonal frequency division multiple access (OFDMA) method, which authorizes multiple access of the STA, may be used. In case an OFDMA-based transmission is supported, a plurality of STAs may transmit uplink frames to one AP via uplink within an overlapped time resource, and one AP may transmit downlink frames to a plurality of STAs via downlink within an overlapped time resource. In case the OFDMA-based transmission is supported, the entire bandwidth may be divided into a plurality of sub-bandwidths (or subchannels or subbands) for each of the plurality of STAs. Each of the plurality of sub-bandwidths (or the plurality of subchannels or the plurality of subbands) may be respectively used for the transmission of uplink data and the reception of downlink data of each of the plurality of STAs.

In case an STF design of a legacy PPDU is used in the OFDMA-based transmission, a specific STA (or user) may be allocated to a band (subband, subchannel) from which an STF signal is not transmitted. In this case, it may be difficult for the STA to perform accurate synchronization, AGC, and channel tracking/channel estimation.

As an automatic gain control, the AGC may automatically change (or vary) a degree of amplification of the receiver in accordance with an intensity of a received signal, so that output, such as voice, can always maintain the same size when receiving a wave having an intensity that varies. More specifically, in case a signal having a high intensity that exceeds regulation is inputted, AGC may control the gain, thereby being capable of preventing signal saturation. Conversely, in case a signal having a low intensity is inputted, the AGC may maintain the intensity of the signal at a predetermined level by increasing the signal up to the regulated level.

AGC may generally be performed on a signal of a time domain before being inputted to a fast fourier transform (FFT) module. In an OFDMA system, which authorizes simultaneous access of a plurality of STAs, different beamforming weights may be applied to each of the subbands being allocated for each of the plurality of STAs. It may be difficult to perform AGC on a signal having different beamforming weights applied thereto for each subband. In a 3rd generation partnership project (3GPP) long term evolution (LTE) system and not the wireless LAN system, the AGC was performed by using a synchronization channel to which beamforming is not applied or common reference signal. However, unlike cellular systems, such as LTE systems, in the wireless LAN system, which uses a radio frequency (RF) module that costs relatively lower, it is difficult to cover signals having a wide power range.

Hereinafter, considering such characteristics of the wireless LAN system, the exemplary embodiment of the present invention discloses a method for performing automatic gain control on a signal having a wide power range and for enhancing performance of the automatic gain control on signals being transmitted by a plurality of STAs and signals being transmitted to a plurality of STAs.

In an OFDMA-based wireless LAN system, after acquiring information on a specific subband (or subchannel) through a FFT module in order to enhance the performance of automatic gain control, AGC per user (or STA) may be performed. The STF may be designed so that the STF sequence can use the tone allocated to the subband for the AGC of each of the plurality of STAs.

More specifically, in the frequency domain, if a subcarrier corresponding to 0 among the elements of the STF sequence is referred to as a null tone (or null subcarrier), and if a subcarrier corresponding to a symbol value (or a coefficient value) other than 0 among the elements of the STF sequence is referred to as a non-null tone (or symbol subcarrier (symbol tone)), the STF may be designed so that a plurality of symbol tones that can ensure the performance of the AGC can be included in the subband transmitting the STF. In case a non-null tone (or symbol tone) for STF that can ensure the performance of the AGC for the STF is included in each of the plurality of subbands, each of the plurality of STAs being allocated to each of the plurality of subband may perform automatic gain control based on the non-null tone. Accordingly, the symbol demodulation performance may be enhanced based on the controlled power scaling range. Hereinafter, the present invention will disclose in detail the design of an STA for the automatic gain control of a plurality of STAs in a wireless LAN system supporting OFDMA. The proposed STF may also be applied to other communication systems (e.g., cellular systems) in addition to the wireless LAN system.

Hereinafter, in the exemplary embodiment of the present invention, the legacy wireless LAN system may also be expressed by using the term legacy (or non-HE) wireless LAN system, the legacy AP may also be expressed by using the term legacy (or non-HE) AP, the legacy frame may also be expressed by using the term legacy (or non-HE) frame, and the legacy PPDU may also be expressed by using the term legacy (or non-HE) PPDU. Also, the wireless LAN system according to the exemplary embodiment of the present invention may also be expressed by using the term high efficiency (HE), the STA according to the exemplary embodiment of the present invention may also be expressed by using the term HE STA, the AP according to the exemplary embodiment of the present invention may also be expressed by using the term HE AP, the frame according to the exemplary embodiment of the present invention may also be expressed by using the term HE frame, and the PPDU according to the exemplary embodiment of the present invention may also be expressed by using the term HE PPDU.

Each field being included in the HE PPDU according to the exemplary embodiment of the present invention may be generated based on an inverse fast fourier transform (IFFT) (or an inverse discrete fourier transform (IDFT)) having different sizes. In other words, each fields being included in the HE PPDU may be decoded based on a fast fourier transform (FFT) (or a discrete fourier transform (DFT)) having different sizes.

Additionally, the HE PPDU may include a non-HE part (or legacy part) and a HE part (non-legacy part). The non-HE part may include fields that can be decoded by the legacy STA and the legacy AP. The HE part may include fields that can be decoded by the HE STA and the HE AP. According to the exemplary embodiment of the present invention, the non-HE part of the HE PPDU may be generated based on a first IFFT size, and some of the fields being included in the HE part of the HE PPDU may also be generated based on the first IFFT size, and the remaining fields of the HE part may be generated based on a second IFFT size.

For example, the second IFFT size may be 4 times larger than the first IFFT size. In case the second IFFT size is 4 times larger than the first IFFT, the HE PPDU may be generated based an IFFT that is 4 times larger than that of the non-HE PPDU corresponding to the given bandwidth. The IFFT that is 4 times larger may be applied to a specific field (e.g., the HE-STF and the fields after the HE-STF that are included in the HE part of the HE PPDU) of the HE PPDU.

Hereinafter, Table 1 discloses an OFDM numerology for generating an BE PPDU that is being used in the HE wireless LAN system according to the exemplary embodiment of the present invention.

Referring to Table 1, an IFFT size that is 4 times larger than the IFFT size for generating a non-HE PPDU corresponding to the given bandwidth may be used for generating the HE PPDU. For example, if an IFFT having the size of 64 is used for generating a non-HE PPDU corresponding to the 20 MHz bandwidth, an IFFT having the size of 256 may be used for generating some of the fields included in the HE PPDU. Furthermore, a case when three DCs (DC tones or DC subcarriers) are included in each band will be assumed herein.

TABLE 1

| Parameter | CBW20 | CBW40 | CBW80 | CBW80 + 80 | CBW160 | Description |
|---|---|---|---|---|---|---|
| $N_{FFT}$ | 256 | 512 | 1024 | 1024 | 2048 | FFT size |
| $N_{SD}$ | 238 | 492 | 1002 | 1002 | 2004 | Number of complex data numbers per frequency segment |

TABLE 1-continued

| Parameter | CBW20 | CBW40 | CBW80 | CBW80 + 80 | CBW160 | Description |
|---|---|---|---|---|---|---|
| $N_{SP}$ | 4 | 6 | 8 | 8 | 16 | Number of pilot values per frequency segment |
| $N_{ST}$ | 242 | 498 | 1010 | 1010 | 2020 | Total number of subcarriers per frequency segment. $N_{ST} = N_{SD} + N_{SP}$ |
| $N_{SR}$ | 122 | 250 | 506 | 506 | 1018 | Highest data subcarrier index per frequency segment |
| $N_{Seg}$ | 1 | 1 | 1 | 2 | 1 | Number of frequency segments |
| $\Delta_F$ | | | 312.5 kHz | | | Subcarrier frequency Spacing for non-HE portion (or legacy portion) |
| $\Delta_{F\_HE}$ | | | 78.125 kHz | | | Subcarrier frequency Spacing for HE portion (or non-legacy portion) |
| $T_{DFT}$ | | | 3.2 μs | | | IDFT/DFT period for non-HE portion |
| $T_{DFT\_HE}$ | | | 12.8 μs | | | IDFT/DFT period for HE portion |
| $T_{GI}$ | | | 0.8 μs = $T_{DFT}/4$ | | | Guard interval duration for non-HE portion |
| $T_{GI\_HE}$ | | | 3.2 μs = $T_{DFT\_HE}/4$ | | | Guard interval duration for HE portion |
| $T_{GI2}$ | | | 1.6 μs | | | Double guard interval duration for non-HE portion |
| $T_{GIS\_HE}$ | | | 0.8 μs = $T_{DFT\_HE}/16$ | | | Short guard interval Duration (used only for HE data) |
| $T_{SYML}$ | | | 4 μs = $T_{DFT} + T_{GI}$ | | | Long GI symbol interval for non-HE portion |
| $T_{SYML\_HE}$ | | | 16 μs = $T_{DFT\_HE} + T_{GI\_HE}$ | | | Long GI symbol interval for HE portion |
| $T_{SYMS}$ | | | 13.6 μs = $T_{DFT\_HE} + T_{GIS\_HE}$ | | | Short GI symbol interval (used only for HE data) |
| $T_{SYM}$ | | | TSYML or TSYMS depending on the GI used | | | Symbol interval |
| $T_{L\text{-}STF}$ | | | 8 μs = 10 * $T_{DFT}/4$ | | | non-HT (or legacy) Short Training field duration |
| $T_{L\text{-}LTF}$ | | | 8 μs = 2 × $T_{DFT} + T_{GI2}$ | | | non-HT (or legacy) Long Training field duration |
| $T_{L\text{-}SIG}$ | | | 4 μs = $T_{SYML}$ | | | non-HT (or legacy) SIGNAL field duration |
| $T_{HE\text{-}SIGA}$ | | | 12.8 μs = $2(T_{SYML} + 3T_{GI})$ | | | HE Signal A field duration |

TABLE 1-continued

| Parameter | CBW20 | CBW40 | CBW80 | CBW80 + 80 | CBW160 | Description |
|---|---|---|---|---|---|---|
| $T_{HE-STF}$ | | | $T_{SYML\_HE}$ | | | HE Short Training field duration |
| $T_{HE-LTF}$ | | | $T_{SYML\_HE}$ | | | Duration of each HE-LTF symbol |
| $T_{HE-SIGB}$ | | | $T_{SYML\_HE}$ | | | HE Signal B field duration |
| $N_{service}$ | | | 16 | | | Number of bits in the SERVICE field |
| $N_{tail}$ | | | 6 | | | Number of tail bits per BCC encoder |

NOTE-
$N_{ST} = N_{SD} + N_{SP}$

Table 2 discloses an OFDM numerology for generating an HE PPDU, which is used in an HE wireless LAN system according to an exemplary embodiment of the present invention.

TABLE 2

| Parameter | CBW20 | CBW40 | CBW80 | CBW80 + 80 | CBW160 | Description |
|---|---|---|---|---|---|---|
| $N_{FFT}$ | 256 | 512 | 1024 | 1024 | 2048 | FFT size |
| $N_{SD}$ | 238(SU) Variable according to unit (OFDMA) | 468(SU) Variable according to unit (OFDMA) | 980(SU) Variable according to unit (OFDMA) | 980(SU) Variable according to unit (OFDMA) | 980*2(SU) Variable according to unit (OFDMA) | Number of complex data numbers per frequency segment |
| $N_{SP}$ | 8(SU) Variable according to unit (OFDMA) | 16(SU) Variable according to unit (OFDMA) | 16(SU) Variable according to unit (OFDMA) | 16(SU) Variable according to unit (OFDMA) | 16*2(SU) Variable according to unit (OFDMA) | Number of pilot values per frequency segment |
| $N_{ST}$ | 242 | 484 | 994 (OFDMA) 996(SU) | 994 (OFDMA) 996(SU) | 996*2 | Total number of subcarriers per frequency segment. $N_{ST} = N_{SD} + N_{SP}$ |
| $N_{SR}$ | 122 | 244 | 500 | 500 | 1012 | Highest data subcarrier index per frequency segment |
| $N_{Seg}$ | 1 | 1 | 1 | 2 | 1 | Number of frequency Segments |
| $\Delta_F$ | | | 312.5 kHz | | | Subcarrier frequency Spacing for non-HE portion |
| $\Delta_{F\_HE}$ | | | 78.125 kHz | | | Subcarrier frequency Spacing for HE portion |
| $T_{DFT}$ | | | 3.2 μs | | | IDFT/DFT period for non-HE portion |
| $T_{DFT\_HE}$ | | | 12.8 μs | | | IDFT/DFT period for HE portion |
| $T_{GI}$ | | | 0.8 μs = $T_{DFT}/4$ | | | Guard interval duration for non-HE portion |
| $T_{GI\_HE}$ | | | 3.2 μs = $T_{DFT\_HE}/4$ | | | Guard interval duration for HE portion |
| $T_{GI2}$ | | | 1.6 μs | | | Double guard interval duration for non-HE portion |
| $T_{GIS\_HE}$ | | | 0.8 μs = $T_{DFT\_HE}/16$ | | | Short guard interval Duration (used only for HE data) |
| $T_{SYML}$ | | | 4 μs = $T_{DFT} + T_{GI}$ | | | Long GI symbol interval for non-HE portion |
| $T_{SYML\_HE}$ | | | {16, 14.4} μs = $T_{DFT\_HE} + T_{GI\_HE}$ | | | Long GI symbol interval for HE portion |

TABLE 2-continued

| Parameter | CBW20 | CBW40 | CBW80 | CBW80 + 80 | CBW160 | Description |
|---|---|---|---|---|---|---|
| $T_{SYMS}$ | | | 13.6 μs = $T_{DFT\_HE}$ + $T_{GIS\_HE}$ | | | Short GI symbol interval (used only for HE data) |
| $T_{SYM}$ | | | TSYML or TSYMS depending on the GI used | | | Symbol interval |
| $T_{L\text{-}STF}$ | | | 8 μs = 10 *$T_{DFT}$/4 | | | non-HT(or legacy) Short Training field duration |
| $T_{L\text{-}LTF}$ | | | 8 μs = 2 × $T_{DFT}$ + $T_{GI2}$ | | | non-HT(or legacy) Long Training field duration |
| $T_{L\text{-}SIG}$ | | | 4 μs = $T_{SYML}$ | | | non-HT(or legacy) SIGNAL field duration |
| $T_{RL\text{-}SIG}$ | | | 4 μs = $T_{SYML}$ | | | Repeated non-HT(or legacy) SIGNAL field duration |
| $T_{HE\text{-}SIGA}$ | | | {8, 16} μs = {2($T_{SYML}$), 4($T_{SYML}$)} | | | HE Signal A field duration (4 symbols when performing SIGA repetition) |
| $T_{HE\text{-}STF}$ | | | {4, 8} μs | | | HE Short Training field duration (1x, 2x mode) |
| $T_{HE\text{-}LTF}$ | | | {6.4, 12.8} μs (excluding GI) | | | Duration of each HE-LTF Symbol (2x, 4x mode) |
| $T_{HE\text{-}SIGB}$ | | | {3.2} μs (excluding GI) | | | Duration of each HE Signal B symbol |
| $N_{service}$ | | | 16 | | | Number of bits in the SERVICE field |
| $N_{tail}$ | | | 6 | | | Number of tail bits per BCC encoder |

NOTE-
$N_{ST} = N_{SD} + N_{SP}$

An HE PPDU for collectively supporting an indoor environment/outdoor environment according to the exemplary embodiment of the present invention will hereinafter be disclosed based on Table 1 for simplicity in the description.

Hereinafter, each of legacy (L)-SIG, HE-SIG A, and HE-SIG B, which correspond to the signal fields that are disclosed herein, may also be expressed by using the terms L-SIG field, HE-SIG A field, and HE-SIG B field, respectively.

Figure 2:
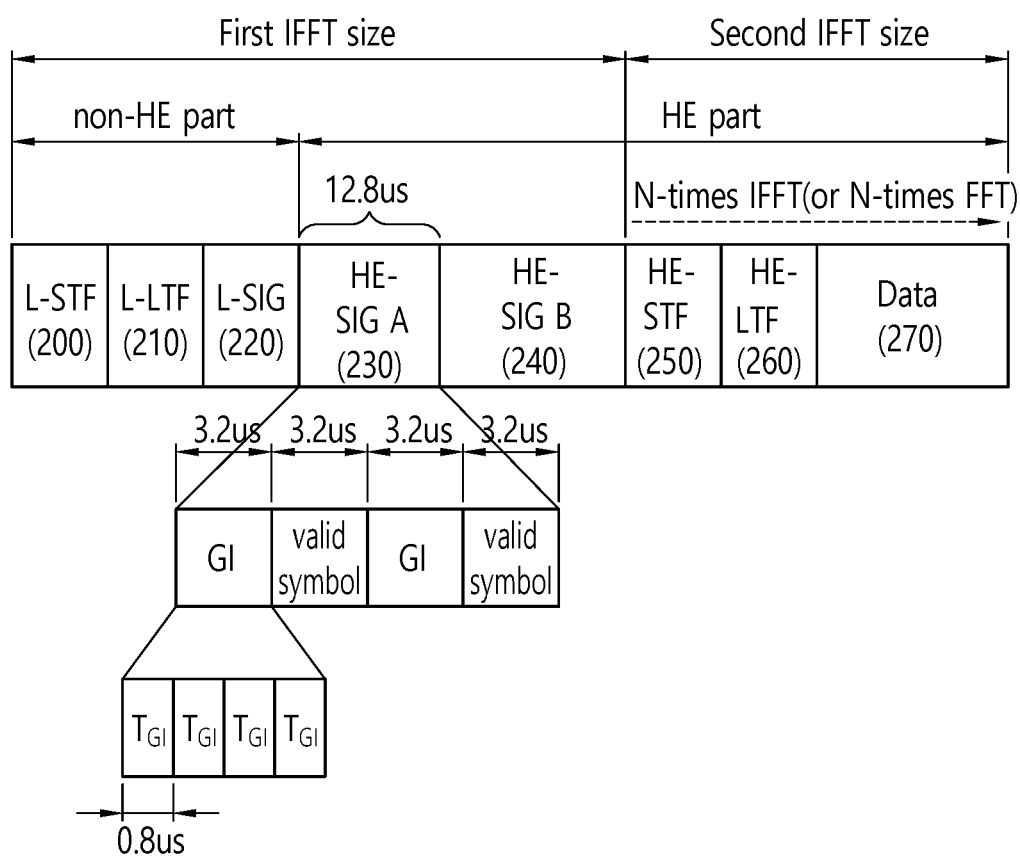
FIG. 2 is a conceptual view illustrating an HE PPDU according to an exemplary embodiment of the present invention.

FIG. 2 is a conceptual view illustrating an HE PPDU according to an exemplary embodiment of the present invention.

Referring to FIG. 2, an HE PPDU may include a non-HE part (or portion) and an HE part (or portion).

The non-HE part of the HE PPDU may include L-STF 200, L-LTF 210, and L-SIG 220.

The HE part of the HE PPDU may include may include HE-SIG A 230, HE-SIG B 240, HE-STF 250, HE-LTF 260, and data field 270.

The L-STF 200 may include a short training orthogonal frequency division multiplexing (OFDM) symbol. The L-STF 200 may be used for frame detection, automatic gain control (AGC), diversity detection, and coarse frequency/time synchronization.

An L-LTF 210 may include a long training orthogonal frequency division multiplexing (OFDM) symbol. The L-LTF 210 may be used for fine frequency/time synchronization and channel prediction.

An L-SIG 220 may be used for transmitting control information. The L-SIG 220 may include information regarding a data rate and a data length.

The L-STF 200, the L-LTF 210, and the L-SIG 220, which are included in the non-HE part, may be generated based on a first IFFT size. In case the HE PPDU is being transmitted within a 20 MHz bandwidth, the L-STF 200, the L-LTF 210, and the L-SIG 220 may be generated based on an IFFT having the size of 64.

In case an IFFT having the size of 64 is being used within a bandwidth of 20 MHz, a subcarrier space ($\Delta_F$) in the non-HE part may be equal to 312.5 kHz.

Each of the plurality of OFDM symbols for transmitting the HE PPDU may include a GI and a valid symbol. A total symbol duration (a total symbol length) of one OFDM symbol may be equal to a value corresponding to the sum of a GI duration (GI length) and a valid symbol duration (valid symbol length).

Based on a 20 MHz band, in case an IFFT having the size of 64 is being used, the total symbol duration (total symbol length) ($T_{SYML}$) for one OFDM symbol in the non-He part may be equal to 4 μs, which corresponds to the sum of the valid symbol duration ($T_{DFT}$) (3.2 μs) and the GI duration ($T_{GI}$) (0.8 μs). More specifically, in case the GI duration is equal to 0.8 μs, the L-STF 200, the L-LTF 210, and the L-SIG 220 may be transmitted over an OFDM symbol having a total symbol duration of 4 μs.

The HE-SIG A 230 may include common information (bandwidth (BW), GI length (or GI duration), BSS index, cyclic redundancy check (CRC), tail bit, and so on) for decoding the HE PPDU.

More specifically, the HE-SIG A 230 may include color bits for identifying a BSS that has transmitted the HE PPDU, bits indicating a total bandwidth size from which the HE PPDU is being transmitted, a tail bit, a CRC bit, and bits indicating the GI length.

Moreover, the HE-SIG A 230 may further include information related to the HE-SIG B 260. For example, the HE-SIG A 230 may further include information on the MCS applied to the HE-SIG B 260 and information on the number of OFDM symbols being allocated for the HE-SIG B 260. Also, the HE-SIG A 230 may also include information on time-spatial streams. For example, the information on the time-spatial streams may include information on the number of time-spatial streams that are used for the transmission of the data field (or MAC payload) from each of the plurality of subchannels through which the HE PPDU of the MU PPDU format is being transmitted.

Additionally, according to the exemplary embodiment of the present invention, the HE-SIG A 230 may further include resource allocation interpretation information for interpreting the resource allocation information included in the HE-SIG B 260.

According to the exemplary embodiment of the present invention, the HE-SIG A 230 may be transmitted over an OFDM symbol having a GI duration that is relatively longer than the GI duration that was used in the non-HE part. For example, the GI duration of an OFDM symbol for the transmission of the HE-SIG A 230 may be equal to an integer multiple (e.g., 4 times) of the GI duration that was used in the non-HE part. Therefore, the problem of variation in the search range between fields (or inter-field search range), which is caused by a change in the IFFT size, may be resolved.

More specifically, the field included in the non-HE part and the HE-SIG A 230 and HE-SIG B 240 included in the HE part may be generated and transmitted based on a first IFFT size (e.g., an IFFT having the size of 64 based on the 20 MHz bandwidth), and the remaining fields included in the HE part may be generated and transmitted based on a second IFFT size (e.g., an IFFT having the size of 256 based on the 20 MHz bandwidth).

If the second IFFT size is larger than the first IFFT size, the valid symbol duration ($T_{DFT\_HE}$=12.8 µs) and the GI duration ($T_{GI\_HE}$=3.2 µs=$T_{DFT\_HE}$/4) of an OFDM symbol that is generated based on the second IFFT size may be larger than the valid symbol duration ($T_{DFT}$=3.2 µs) and the GI duration ($T_{GI}$=0.8 µs=$T_{DFT}$/4) of an OFDM symbol that is generated based on the first IFFT size. For example, in case the second IFFT size is equal to 256 and the first IFFT size is equal to 64, the GI duration (3.2 µs=$T_{DFT\_HF}$/4) of the OFDM symbol that is generated based on the second IFFT size may be 4 times larger than the GI duration (0.8 µs=$T_{DFT}$/4) of the OFDM symbol that is generated based on the first IFFT size.

As the GI duration becomes relatively longer, the robustness against reflected waves and the resistance to noise may become more enhanced. In other words, as the GI duration becomes relatively longer, an interference caused by a delay spread signal having a time delay of a larger value may not cause any influence, and transmission coverage of data that are transmitted over the corresponding OFDM symbol may be increased.

Therefore, in the HE part of the HE PPDU, a search range of the HE-SIG A 230 may be corrected (or amended) based on the correction (or amendment) of the GI duration of the HE-SIG A 230. In the HE part of the HE PPDU, the correction of the GI duration of the HE-SIG B 240 may be performed by using the same method. For example, the HE-SIG A 230 that is transmitted after the non-HE part may be transmitted over an OFDM symbol having a total symbol duration of 6.4 µs including a GI duration of 3.2 µs and a valid symbol duration of 3.2 µs. The OFDM symbol having the total symbol duration of 6.4 µs may include a total OFDM symbol length ($T_{SYML}$(4 µs)=$T_{DFT}$(3.2 µs)+$T_{GI}$(0.8 µs)) that was originally used in the non-HE part and additional $3T_{GI}$(2.4 µs). More specifically, the HE-SIG A 230 may be transmitted over an OFDM symbol having a duration of $T_{SYML}$(4 µs)+$3T_{GI}$(2.4 µs)=6.4 µs instead of an OFDM symbol having a duration of $T_{SYML}$(4 µs).

In case the HE-SIG A 230 is transmitted over two OFDM symbols, the HE-SIG A 230 may be transmitted over two OFDM symbols having a duration of 2($T_{SYML}$(4 µs)+$3T_{GI}$(2.4 µs)=6.4 µs)=12.8 µs.

In case an IFFT that is 4 times larger is applied starting from the HE-STF 240 in the HE PPDU, the HE-STF 240 and the fields after the HE-STF 240 may be transmitted over an OFDM symbol having a total symbol duration of $T_{SYML\_HE}$ (16 µs)=$T_{DFT\_HE}$(12.8 µs)+$T_{GI\_HE}$(3.2 µs). More specifically, the GI duration ($4T_{GI}$(3.2 µs)) that is used for the transmission of HE-SIG A 230 may be identical to $T_{GI_{HE}}$(3.2 µs), which corresponds to a GI duration for transmitting the remaining fields of the HE part to which the IFFT that is 4 times larger (or 4-times IFFT) is applied.

The HE-SIG B 260 may include information on each of the plurality of STAs that are to receive the HE PPDU (or HE PPDU of the MU PPDU format). For example, the HE-SIG B 260 may include identification information (e.g., partial association identifier (PAID), group identifier (GID)) of the plurality of STAs that are to receive the HE PPDU.

Moreover, the HE-SIG B 240 may include information on resources allocated to each of the plurality of STAs that are to receive the HE PPDU (or HE PPDU of the MU PPDU format). More specifically, the HE-SIG B 240 may also include OFDMA-based resource allocation information (or MU-MIMO information) corresponding to each of the plurality of STAs that are to receive the HE PPDU of the MU PPDU format. For example, the HE-SIG B 240 may include information on the allocation subchannels and/or allocation time-spatial streams of the fields after the HE-SIG B 240 (e.g., the HE-STF 250, the HE-LTF 260, and the data field (or MAC payload) 270). Furthermore, the HE-SIG B 240 may include information for decoding the data field (or MAC payload) 270. The information for deciding the data field may include MCS, Coding, space time block coding (STBC), transmit beamforming (TXBF), and so on.

The HE-STF 250 may be used for enhancing automatic gain control estimation in a multiple input multiple output (MIMO) environment or an OFDMA environment. More specifically, the HE-STF 250 may be used for performing automatic gain control estimation and channel estimation for the decoding of the following fields that are transmitted through the same subchannel as the subchannel through which the HE-STF 250 is transmitted.

The HE-LTF 260 may be used for estimating a channel in a MIMO environment or an OFDMA environment. More specifically, the HE-LTF 260 may be used for performing channel estimation for the decoding of the following fields that are transmitted through the same subchannel as the subchannel through which the HE-LTF 260 is transmitted.

The data field 270 may include data that are to be transmitted to the receiving STA. The data field 270 may include a MAC header and a MSDU (or MAC body). The MAC header may include a duration/ID field on a time resource for a transmission procedure of the HE PDDU, an identifier of a transmitting STA that has transmitted the MAC payload (or frame), and an identifier of a receiving STA that is to receive the MAC payload (or frame). The MSDU may include downlink data that are to be transmitted to the receiving STA pending on the transmitting STA.

The PPDU that is disclosed in FIG. 2 may also be expressed as described below.

A transmitting STA generates a PPDU, and at least one transmitting STA transmits a PPDU to at least one receiving STA, and the PPDU may sequentially a first signal field (e.g., L-SIG) and a second signal field (e.g., HE-SIG), and a training field (e.g., HE-STF). The first signal field may be generated based on a first inverse fast fourier transform (IFFT) and may be transmitted over a first orthogonal frequency division multiplexing (OFDM) symbol, the second signal may be generated based on a first IFFT size and may be transmitted over a second OFDM symbol, and the training field may be generated based on a second IFFT size and may be transmitted over a third OFDM symbol. Herein, the second IFFT size may be equal to an integer multiple of the first IFFT size. A total symbol duration of the first OFDM symbol may include a first GI duration that is determined based on a first IFFT size and a first valid symbol duration that is determined based on the first IFFT size. A total symbol duration of the second OFDM symbol may include a second GI duration corresponding to an integer multiple of the first duration and a first valid symbol duration. A total symbol duration of the third OFDM symbol may include a third GI duration that is determined based on the second IFFT size and a second valid symbol duration.

At this point, the first IFFT size is equal to 64, the second IFFT size is equal to 256, the first GI duration is equal to 0.8 μs, the second GI duration is equal to 3.2 μs, the third GI duration is equal to 3.2 μs, the first valid symbol duration is equal to 3.2 μs, and the second valid symbol duration is equal to 12.8 μs.

Hereinafter, a design of the STF according to the exemplary embodiment of the present invention will be disclosed. First of all, a group of basic sequence elements that are used for the design of the STF will be disclosed. The STF may be used in the meaning of including both the L-STF and the HE-STF.

$0_5$ may indicate a subset of an STF sequence including five consecutive sequence elements corresponding to 0, $0_7$ may indicate a subset of an STF sequence including seven consecutive sequence elements corresponding to 0, and $0_{12}$ may indicate a subset of an STF sequence including twelve consecutive sequence elements corresponding to 0. More specifically, $0_5$ may indicate {0, 0, 0, 0, 0} in an STF sequence, $0_7$ may indicate {0, 0, 0, 0, 0, 0, 0} in an STF sequence, and $0_{12}$ may indicate {0, 0, 0, 0, 0, 0, 0, 0, 0, 0, 0, 0} in an STF sequence.

$C_{52}$ may correspond to a subset of an STF sequence having a size of 52. $C_{52}$ may be defined as shown below in Equation 1.

$$C_{52} = \frac{1}{\sqrt{2}}\{0,0,0,c_1,0,0,0,c_2,0,0,0,c_3,0,0,0,c_4,0,0,$$
$$0,c_5,0,0,0,c_6,0,0,0,0,0,0,0,c_7,0,0,0,c_8,0,$$
$$0,0,c_9,0,0,0,c_{10},0,0,0,c_{11}0,0,0,c_{12}\}$$
<Equation 1>

In case $C_{52}$ is being used, four null tones including a DC may be positioned at the center. Also, three null tones may be positioned between non-null tones (or symbols).

At this point, the values of each of $c_1 \sim c_{12}$ may be as shown below in Equation 2.

$$\{c_1,c_2,c_3,c_4,c_5,c_6,c_7,c_8,c_9,c_{10},c_{11},c_{12}\}=\{1+j,-1-j,1+j,$$
$$-1,-j,-1-j,1+j,-1-j,-1-j,1+j,1+j,1+j,1+j\}$$
<Equation 2>

The above-described $C_{52}$ corresponds to an exemplary subset of an STF sequence having the size of 52. According to the exemplary embodiment of the present invention, a subset of another STF sequence having the size of 52 may be defined as $C_{52}$ and may then be used for designing the STF sequence.

Figure 3:
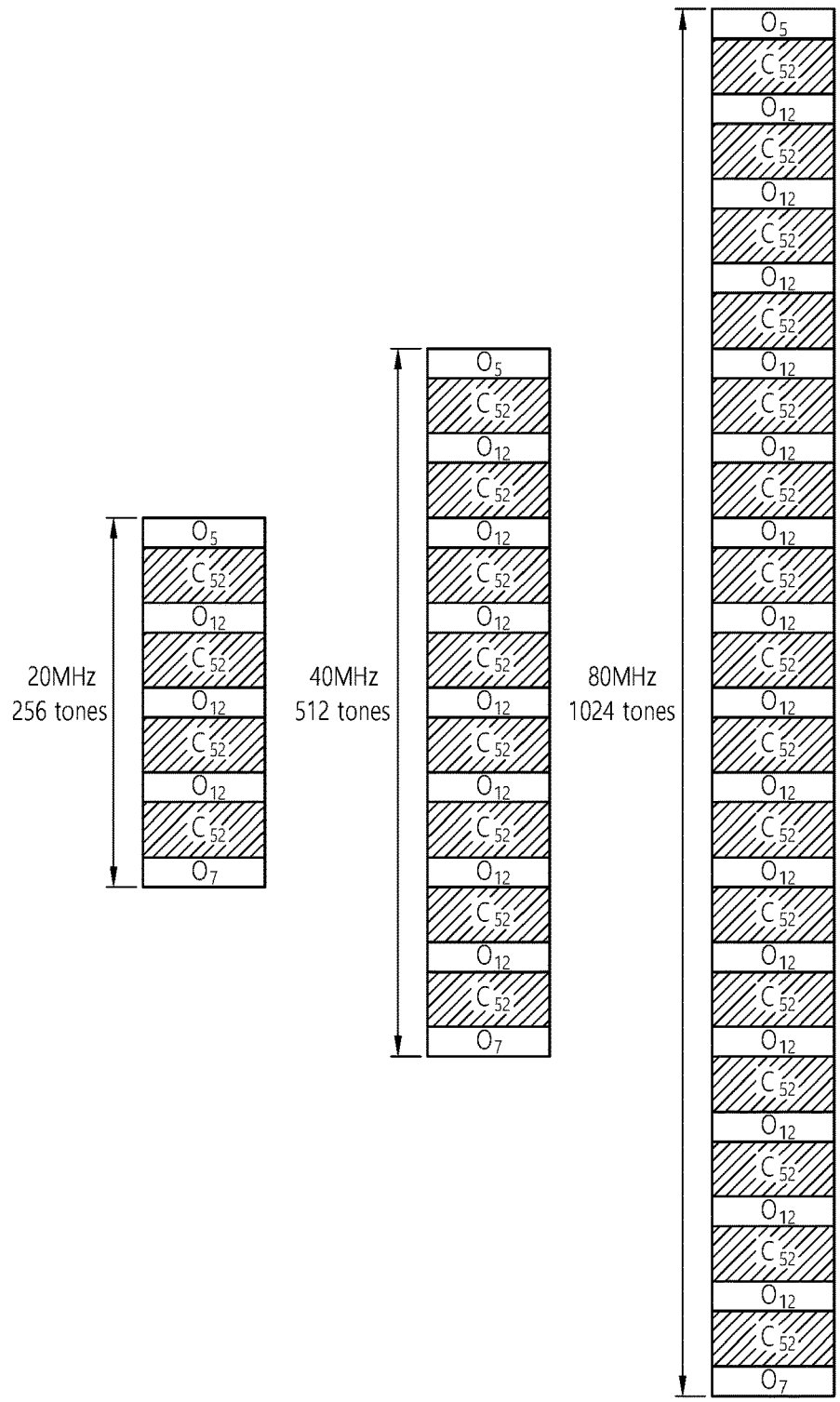
FIG. 3 is a conceptual view illustrating a design of an STF sequence according to an exemplary embodiment of the present invention.

FIG. 3 is a conceptual view illustrating a design of an STF sequence according to an exemplary embodiment of the present invention.

FIG. 3 discloses a basic structure (or basic design) of an STF sequence in bandwidths of 20 MHz, 40 MHz, and 80 MHz. The STF sequence that is disclosed in FIG. 3 may also be expressed by the term basic STF sequence. The STF may refer to the above-described training field (L-STF, HE-STF, and so on).

Referring to the left side of FIG. 3, the basic sequence corresponding to 256 tones that are allocated to the 20 MHz bandwidth may correspond to $\{0_5, C_{52}, 0_{12}, C_{52}, 0_{12}, C_{52}, 0_{12}, C_{52}, 0_7\}$. Each sequence element starting from the left end may respectively correspond to each tone starting from the leftmost tone. Each of the 256 sequence elements included in the STF sequence for the 20 MHz bandwidth may respectively correspond to each of the 256 tones that are allocated to the 20 MHz bandwidth. In the STF sequence, $0_{12}$, which corresponds to the 12 sequence elements that are aligned at the center of the sequence, may include a DC tone.

Referring to the center of FIG. 3, the basic sequence corresponding to 512 tones that are allocated to the 40 MHz bandwidth may correspond to $\{0_5, C_{52}, 0_{12}, C_{52}, 0_{12}, C_{52}, 0_{12}, C_{52}, 0_{12}, C_{52}, 0_{12}, C_{52}, 0_{12}, C_{52}, 0_7\}$. Each of the 512 sequence elements included in the STF sequence for the 40 MHz bandwidth may respectively correspond to each of the 512 tones that are allocated to the 40 MHz bandwidth. In the STF sequence, $0_{12}$, which corresponds to the 12 sequence elements that are aligned at the center of the sequence, may include a DC tone. $C_{52}, 0_{12}, C_{52}, 0_{12}, C_{52}, 0_{12}, C_{52}$ may be repeated based on the $0_{12}$ including the DC tone.

Referring to the right side of FIG. 3, the basic sequence corresponding to 1024 tones that are allocated to the 80 MHz bandwidth may correspond to $\{0_5, C_{52}, 0_{12}, C_{52}, 0_{12}, C_{52}, 0_{12}, C_{52}, 0_{12}, C_{52}, 0_{12}, C_{52}, 0_{12}, C_{52}, 0_{12}, C_{52}, 0_{12}, C_{52}, 0_{12}, C_{52}, 0_{12}, C_{52}, 0_{12}, C_{52}, 0_{12}, C_{52}, 0_{12}, C_{52}, 0_7\}$. Each of the 1024 sequence elements included in the STF sequence for the 80 MHz bandwidth may respectively correspond to each of the 1024 tones that are allocated to the 80 MHz bandwidth. In the STF sequence, $0_{12}$, which corresponds to the 12 sequence elements that are aligned at the center of the sequence, may include a DC tone. In the STF sequence, $0_{12}$, which corresponds to the 12 sequence elements that are aligned at the center of the sequence, may include a DC tone. $C_{52}, 0_{12}, C_{52}, 0_{12}, C_{52}, 0_{12}, C_{52}$ may be repeated 4 times based on the $0_{12}$ including the DC tone.

An STF that is generated based on the above-described basic STF sequence may be transmitted through a PPDU.

According to the exemplary embodiment of the present invention, among the plurality of null tones corresponding to $0_{12}$ in the basic STF sequence, some of the null tones may be used as symbol tones. In other words, among the 12 consecutive sequence element 0's that are included in $0_{12}$, some of the sequence element 0's may include symbol values. More specifically, the STF sequence may be designed (or defined) so that the symbol tones are positioned at intervals of 4 tones (or 2 tones) among the 12 null tones that are included in $0_{12}$. In case the symbol tones are positioned at consistent intervals within the plurality of null tones corresponding to $0_{12}$, $0_{12}$ may be expressed as $D_{12}$. More specifically, $D_{12}$ may include sequence elements indicating symbol values other than 0 at consistent tone intervals.

In case $D_{12}$ is included in the basic STF sequence instead of $0_{12}$, the number of null tones may be restricted (or limited). In case this method is used, the number of non-null tones for the AGC may be increased in the subband. When receiving an STF through its allocated subband, the STA may perform automatic gain control based on a symbol value through a non-null tone (or symbol tone).

Figure 4:
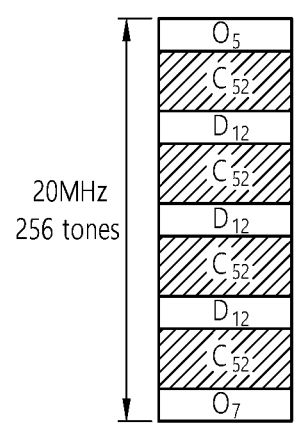
FIG. 4 is a conceptual view illustrating a design of an STF sequence according to an exemplary embodiment of the present invention.

FIG. 4 is a conceptual view illustrating a design of an STF sequence according to an exemplary embodiment of the present invention.

FIG. 4 discloses a structure (or design) of an STF sequence in a 20 MHz bandwidth.

Referring to FIG. 4, $D_{12}$ may be included in the STF sequence instead of $0_{12}$. In case $D_{12}$ is included in the STF sequence, the tones corresponding to $C_{52}$ and the tones corresponding to $D_{12}$ may be consecutively positioned within the entire bandwidth. In case the tones corresponding to $C_{52}$ and the tones corresponding to $D_{12}$ are consecutively positioned within the entire bandwidth, the non-null tones for the AGC included in the subband for the STF may be increased.

Additionally, according to the exemplary embodiment of the present invention, in the STF sequence, the $\gamma_k$ value may be applied in $\{C_{52}\ D_{12}\}$ units. The $\gamma_k$ value may be used for phase rotation of a tone. The phase rotation of a tone may be used for decreasing a peak to average power ratio (PAPR). The last block (unit) to which the $\gamma_k$ is applied may include only $C_{52}$. Also, $D'_{12}$, which considers the insertion of a DC tone, may be used instead of $D_{12}$, which corresponds to a tone positioned at the center of the bandwidth. $D'_{12}$ may correspond to a subset of the STF sequence that has processed nulling of the symbol values of some of the sequence elements among the sequence elements included in $D_{12}$ to 0, while considering the insertion of a DC tone.

$D_{12}$ may be defined as shown below in Equation 3.

$$D_{12}=\{0,0,0,1+j,0,0,0,-1-j,0,0,0,-1-j\} \quad \text{<Equation 3>}$$

As described above, $C_{52}$ may be defined as shown below in Equation 4.

$$C_{52} = \frac{1}{\sqrt{2}}\{0, 0, 0, 1 + j, 0, 0, 0, -1 - j, 0, 0, 0, 1 + j, 0, 0, 0,$$
$$-1 - j, 0, 0, 0, -1 - j, 0, 0, 0, 1 + j, 0, 0, 0, 0, 0,$$
$$0, 0, -1 - j, 0, 0, 0, -1 - j, 0, 0, 0, 1 + j,$$
$$0, 0, 0, 1 + j, 0, 0, 0, 1 + j, 0, 0, 0, 1 + j\} \quad \text{<Equation 4>}$$

Referring to FIG. 4, in the 20 MHz bandwidth, the STF sequence may be defined as shown below in Equation 5.

$$S_{20\ MHz}=[0_5,C_{52},D_{12},C_{52},D_{12},C_{52},D_{12},C_{52},0_7]$$

$$S_{20\ MHz\_rotation}=[0_5,C_{52}\times\gamma_1^{(20)},D_{12}\times\gamma_1^{(20)},C_{52}\times\gamma_2^{(20)},$$
$$D_{12}\times\gamma_2^{(20)},C_{52}\times\gamma_3^{(20)},D_{12}\times\gamma_3^{(20)},C_{52}\times\gamma_4^{(20)},0_7] \quad \text{<Equation 5>}$$

$S_{20\ MHz}$ may correspond to an STF sequence that has not performed phase rotation, and $S_{20\ MHz\_rotation}$ may correspond to an STF sequence to which the phase rotation is applied. $S_{20\ MHz\_rotation}$ may be determined by multiplying a first $[C_{52}, D_{12}]$, which is near the leftmost tone, by $\gamma_1^{(20)}$, and, sequentially, by multiplying a second $[C_{52}, D_{12}]$ by $\gamma_2^{(20)}$, by multiplying a third $[C_{52}, D_{12}]$ by $\gamma_3^{(20)}$, and by multiplying a last $[C_{52}, D_{12}]$ by $\gamma_4^{(20)}$.

The $Y_k^{(20)}$ value that optimizes the PAPR(=1.7379) of the STF for the 20 MHz bandwidth may be defined as shown below in Table 3.

TABLE 3

| Index | $\gamma_1^{(20)}$ | $\gamma_2^{(20)}$ | $\gamma_3^{(20)}$ | $\gamma_4^{(20)}$ |
|---|---|---|---|---|
| 1 | 1 | 1 | 1 | −1 |
| 2 | 1 | −1 | −1 | −1 |
| 3 | −1 | 1 | 1 | 1 |
| 4 | −1 | −1 | −1 | 1 |
| 5 | 1i | 1i | 1i | −1i |
| 6 | 1i | 1i | 1i | −1i |
| 7 | −1i | 1i | 1i | 1i |
| 8 | −1i | −1i | −1i | −1i |

Referring to Table 3, a total of 8 different types of optimal $Y_1^{(20)}$, $Y_2^{(20)}$, $Y_3^{(20)}$, $Y_4^{(20)}$ may exist.

Each row represents values respective to each of $Y_1^{(20)}$, $Y_2^{(20)}$, $Y_3^{(20)}$, $Y_4^{(20)}$, and each column represents $Y_1^{(20)}$, $Y_2^{(20)}$, $Y_3^{(20)}$, $Y_4^{(20)}$, satisfying PAPR=1.7379.

According to the exemplary embodiment of the present invention, as described above in FIG. 3, a basic STF sequence using $0_{12}$ instead of $D_{12}$ may also be used. In other words, the STF may be generated by using $0_{12}$ without replacing $0_{12}$ to $D_{12}$. The basic STF sequence may be defined as shown below in Equation 6.

$$S_{20\ MHz}=[0_5,C_{52},0_{12},C_{52},0_{12},C_{52},0_{12},C_{52},0_7]$$

$$S_{20\ MHz\_rotation}=[0_5,C_{52}\times\gamma_1^{(20)},0_{12}\times\gamma_1^{(20)},C_{52}\times\gamma_2^{(20)},$$
$$0_{12}\times\gamma_2^{(20)},C_{52}\times\gamma_3^{(20)},0_{12}\times\gamma_3^{(20)},C_{52}\times\gamma_4^{(20)},0_7] \quad \text{<Equation 6>}$$

$S_{20\ MHz}$ may correspond to a basic STF sequence to which phase rotation is not applied, and $S_{20\ MHz\_rotation}$ may correspond to a basic STF sequence to which phase rotation is applied. $S_{20\ MHz\_rotation}$ may be determined by multiplying a first $[C_{52}, 0_{12}]$, which is near the leftmost tone, by $\gamma_1^{(20)}$, and, sequentially, by multiplying a second $[C_{52}, 0_{12}]$ by $\gamma_2^{(20)}$, by multiplying a third $[C_{52}, 0_{12}]$ by $\gamma_3^{(20)}$, and by multiplying a last $[C_{52}, 0_{12}]$ by $\gamma_4^{(20)}$.

In case the basic STF sequence is used, the $Y_k^{(20)}$ value that optimizes the PAPR(=1.6746) of the STF for the 20 MHz bandwidth may be defined as shown below in Table 4.

TABLE 4

| index | $\gamma_1^{(20)}$ | $\gamma_2^{(20)}$ | $\gamma_3^{(20)}$ | $\gamma_4^{(20)}$ |
|---|---|---|---|---|
| 1 | 1 | 1 | 1 | −1 |
| 2 | 1 | 1 | −1 | 1 |
| 3 | 1 | −1 | 1 | 1 |
| 4 | 1 | −1 | −1 | −1 |
| 5 | 1 | 1i | 1 | −1i |
| 6 | 1 | 1i | −1 | 1i |
| 7 | 1 | −1i | 1 | 1i |
| 8 | 1 | −1i | −1 | −1i |
| 9 | −1 | 1 | 1 | 1 |
| 10 | −1 | 1 | −1 | −1 |
| 11 | −1 | −1 | 1 | −1 |
| 12 | −1 | −1 | −1 | 1 |
| 13 | −1 | 1i | 1 | 1i |
| 14 | −1 | 1i | −1 | −1i |
| 15 | −1 | −1i | 1 | −1i |
| 16 | −1 | −1i | −1 | 1i |
| 17 | 1i | 1 | 1i | −1 |
| 18 | 1i | 1 | −1i | 1 |
| 19 | 1i | −1 | 1i | 1 |
| 20 | 1i | −1 | −1i | −1 |

TABLE 4-continued

| index | $\gamma_1^{(20)}$ | $\gamma_2^{(20)}$ | $\gamma_3^{(20)}$ | $\gamma_4^{(20)}$ |
|---|---|---|---|---|
| 21 | 1i | 1i | 1i | -1i |
| 22 | 1i | 1i | -1i | 1i |
| 23 | 1i | -1i | 1i | 1i |
| 24 | 1i | -1i | -1i | -1i |
| 25 | -1i | 1 | 1i | 1 |
| 26 | -1i | 1 | -1i | -1 |
| 27 | -1i | -1 | 1i | -1 |
| 28 | -1i | -1 | -1i | 1 |
| 29 | -1i | 1i | 1i | 1i |
| 30 | -1i | 1i | -1i | -1i |
| 31 | -1i | -1i | 1i | -1i |
| 32 | -1i | -1i | -1i | 1i |

Referring to Table 4, a total of 32 different types of optimal $Y_1^{(20)}$, $Y_2^{(20)}$, $Y_3^{(20)}$, $Y_4^{(20)}$ may exist. Similarly, each row represents values respective to each of $Y_1^{(20)}$, $Y_2^{(20)}$, $Y_3^{(20)}$, $Y_4^{(20)}$, and each column represents $Y_1^{(20)}$, $Y_2^{(20)}$, $Y_3^{(20)}$, $Y_4^{(20)}$ satisfying PAPR=1.6746.

Figure 5:
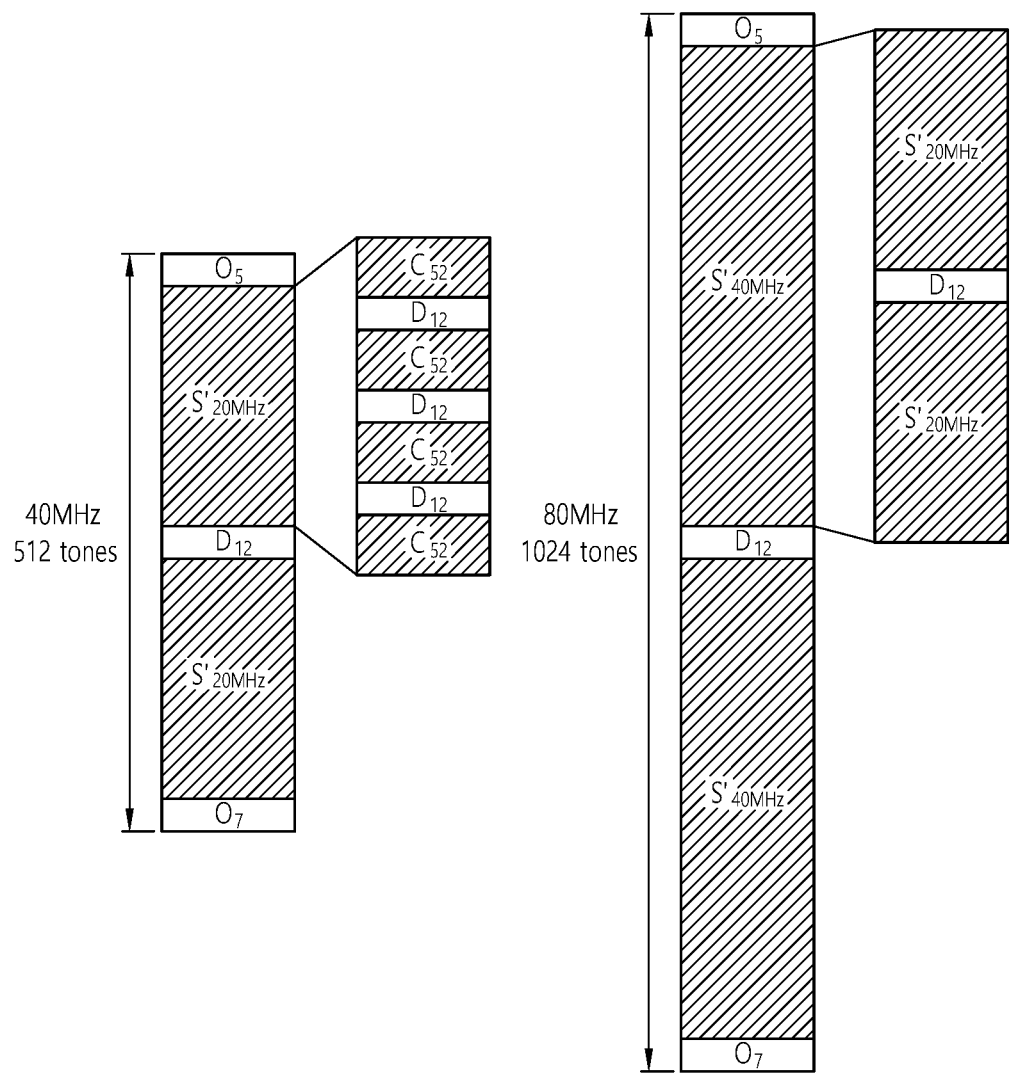
FIG. 5 is a conceptual view illustrating a design of an STF sequence according to an exemplary embodiment of the present invention.

FIG. 5 is a conceptual view illustrating a design of an STF sequence according to an exemplary embodiment of the present invention.

FIG. 5 discloses a structure of an STF sequence in each of a 40 MHz bandwidth and an 80 MHz bandwidth.

Referring to the left side of FIG. 5, in the 40 MHz bandwidth, the STF sequence may be defined as shown below in Equation 7.

$$S_{40\ MHz}=[0_5, S'_{20\ MHz}, D_{12}, S'_{20\ MHz}, 0_7]$$

$$S'_{20\ MHz}=[C_{52}, D_{12}, C_{52}, D_{12}, C_{52}, D_{12}, C_{52}]$$

$$S_{40\ MHz\_rotation}=[0_5, S'_{20\ MHz} \times \gamma_1^{(40)}, D_{12} \times \gamma_1^{(40)}, S'_{20\ MHz} \times \gamma_2^{(40)}, 0_7]$$

$S_{40\ MHz}$ may correspond to a basic STF sequence that has not performed phase rotation, and $S'_{20\ MHz}$ may correspond to a subset of the STF sequence excluding $0_5$ and $0_7$ from $S_{20\ MHz}$. $S_{40\ MHz\_rotation}$ may correspond to basic STF sequence to which phase rotation is applied. $S_{40\ MHz\_rotation}$ may be determined by multiplying a first $[S'_{20\ MHz}, D_{12}]$, which is near the leftmost tone, by $\gamma_1^{(40)}$, and by multiplying $S'_{20\ MHz}$ by $\gamma_2^{(40)}$.

Referring to the right side of FIG. 5, in the 80 MHz bandwidth, the STF sequence may be defined as shown below in Equation 8.

$$S_{80\ MHz}=[0_5, S'_{40\ MHz}, D_{12}, S'_{40\ MHz}, 0_7]$$

$$S'_{40\ MHz}=[S'_{20\ MHz}, D_{12}, S'_{20\ MHz}]$$

$$S_{80\ MHz\_rotation}=[0_5, S'_{40\ MHz} \times \gamma_1^{(80)}, D_{12} \times \gamma_1^{(80)}, S'_{40\ MHz} \times \gamma_2^{(80)}, 0_7]$$ <Equation 8>

$S_{80\ MHz}$ may correspond to a basic STF sequence that has not performed phase rotation, and $S'_{40\ MHz}$ may correspond to a subset of the STF sequence excluding $0_5$ and $0_7$ from $S_{40\ MHz}$, $S_{80\ MHz\_rotation}$ may correspond to basic STF sequence to which phase rotation is applied. $S_{80\ MHz\_rotation}$ may be determined by multiplying a first $[S'_{40\ MHz}, D_{12}]$, which is near the leftmost tone, by $\gamma_1^{(80)}$, and by multiplying $S'_{40\ MHz}$ by $\gamma_2^{(80)}$.

Figure 6:
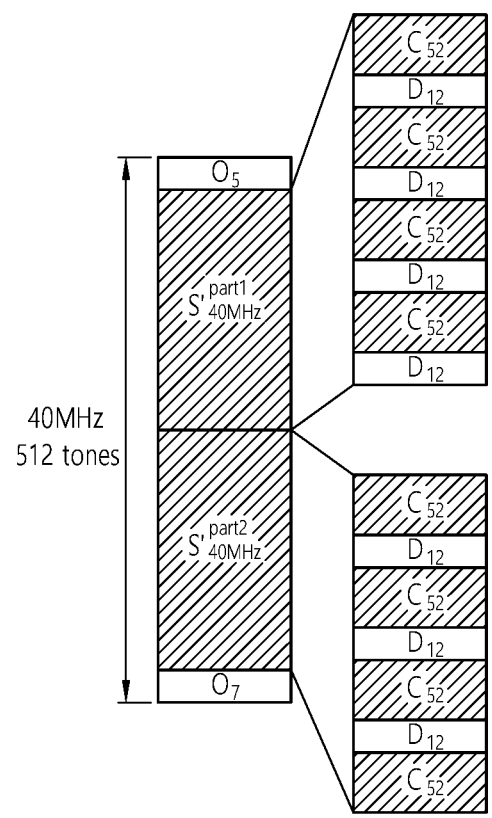
FIG. 6 is a conceptual view illustrating a design of an STF sequence according to an exemplary embodiment of the present invention.

FIG. 6 is a conceptual view illustrating a design of an STF sequence according to an exemplary embodiment of the present invention.

FIG. 6 discloses a structure of another STF sequence on the 40 MHz bandwidth. In FIG. 6, $\gamma_k$ may be applied to a subset unit $[C_{52}, D_{12}]$ of the STF sequence.

Referring to FIG. 6, in the 40 MHz bandwidth, the STF sequence may be defined as shown below in Equation 9.

$$S_{40\ MHz}^{part1}=[C_{52}, D_{12}, C_{52}, D_{12}, C_{52}, D_{12}, C_{52}, D_{12}]$$

$$S_{40\ MHz\_rotation}^{part2}=[C_{52} \times \gamma_1^{(40)}, D_{12} \times \gamma_1^{(40)}, C_{52} \times \gamma_2^{(40)}, D_{12} \times \gamma_2^{(40)}, C_{52} \times \gamma_3^{(40)}, D_{12} \times \gamma_3^{(40)}, C_{52} \times \gamma_4^{(40)}, D_{12} \times \gamma_4^{(40)}]$$

$$S_{40\ MHz}^{part2}=[C_{52}, D_{12}, C_{52}, D_{12}, C_{52}, D_{12}, C_{52}]$$

$$S_{40\ MHz\_rotation}^{part2}=[C_{52} \times \gamma_5^{(40)}, D_{12} \times \gamma_5^{(40)}, C_{52} \times \gamma_6^{(40)}, D_{12} \times \gamma_6^{(40)}, C_{52} \times \gamma_7^{(40)}, D_{12} \times \gamma_7^{(40)}, C_{52} \times \gamma_8^{(40)}]$$

$$S_{40\ MHz\_rotation}=[0_5, S_{40\ MHz}^{part1}, S_{40\ MHz}^{part2}, 0_7]$$ <Equation 9>

Referring to Equation 9, $\gamma_k$ may be multiplied in subset units of $[C_{52}, D_{12}]$ of the STF sequence. $S_{40\ MHz\_rotation}$ may be determined by multiplying a first $[C_{52}, D_{12}]$, which is near the leftmost tone, by $\gamma_1^{(40)}$, by multiplying a second $[C_{52}, D_{12}]$ by $\gamma_2^{(40)}$, by multiplying a third $[C_{52}, D_{12}]$ by $\gamma_3^{(40)}$, by multiplying a fourth $[C_{52}, D_{12}]$ by $\gamma_4^{(40)}$, by multiplying a fifth $[C_{52}, D_{12}]$ by $\gamma_5^{(40)}$, by multiplying a sixth $[C_{52}, D_{12}]$ by $\gamma_6^{(40)}$, by multiplying a seventh $[C_{52}, D_{12}]$ by $\gamma_7^{(40)}$, and by multiplying a last $C_{52}$ by $\gamma_8^{(40)}$.

Table 5 shown below discloses $\gamma_k$ for satisfying a PAPR (=2.0227) of an STF sequence corresponding to the 40 MHz bandwidth. 8 different types of $\gamma_k$ satisfying the PAPR (=2.0227) may exist.

TABLE 5

| index | $\gamma_1^{(40)}$ | $\gamma_2^{(40)}$ | $\gamma_3^{(40)}$ | $\gamma_4^{(40)}$ | $\gamma_5^{(40)}$ | $\gamma_6^{(40)}$ | $\gamma_7^{(40)}$ | $\gamma_8^{(40)}$ |
|---|---|---|---|---|---|---|---|---|
| 1 | 1 | 1i | -1 | -1 | -1 | 1i | 1 | -1 |
| 2 | 1 | -1i | -1 | -1 | -1 | -1i | 1 | -1 |
| 3 | -1 | 1i | 1 | 1 | 1 | 1i | -1 | 1 |
| 4 | -1 | -1i | 1 | 1 | 1 | -1i | -1 | 1 |
| 5 | 1i | 1 | -1i | -1i | -1i | 1 | 1i | -1i |
| 6 | 1i | -1 | -1i | -1i | -1i | -1 | 1i | -1i |
| 7 | -1i | 1 | 1i | 1i | 1i | 1 | -1i | 1i |
| 8 | -1i | -1 | 1i | 1i | 1i | -1 | -1i | 1i |

Also, according to the exemplary embodiment of the present invention, $0_{12}$ is used instead of $D_{12}$, and, accordingly, in the 40 MHz bandwidth, the basic STF sequence may be defined as shown below in Equation 10.

$$S_{40\ MHz}^{part1}=[C_{52}, 0_{12}, C_{52}, 0_{12}, C_{52}, 0_{12}, C_{52}, 0_{12}]$$

$$S_{40\ MHz\_rotation}^{part1}=[C_{52} \times \gamma_1^{(40)}, 0_{12} \times \gamma_1^{(40)}, C_{52} \times \gamma_2^{(40)}, 0_{12} \times \gamma_2^{(40)}, C_{52} \times \gamma_3^{(40)}, 0_{12} \times \gamma_3^{(40)}, C_{52} \times \gamma_4^{(40)}, 0_{12} \times \gamma_4^{(40)}]$$

$$S_{40\ MHz}^{part2}=[C_{52}, 0_{12}, C_{52}, 0_{12}, C_{52}, 0_{12}, C_{52}]$$

$$S_{40\ MHz\_rotation}^{part2}=[C_{52} \gamma_5^{(40)}, 0_{12} \times \gamma_5^{(40)}, C_{52} \gamma_6^{(40)}, 0_{12} \times \gamma_6^{(40)}, C_{52} \gamma_7^{(40)}, 0_{12} \times \gamma_7^{(40)}, C_{52} \gamma_8^{(40)}]$$

$$S_{40\ MHz}=[0_5, S_{40\ MHz}^{part1}, S_{40\ MHz}^{part2}, 0_7]$$

$$S_{40\ MHz\_rotation}=[0_5, S_{40\ MHz\_rotation}^{part1}, S_{40\ MHz\_rotation}^{part2}, 0_7]$$ <Equation 10>

Referring to Equation 10, $\gamma_k$ may be multiplied in subset units of $[C_{52}, 0_{12}]$ of the basic STF sequence. $S_{40\ MHz\_rotation}$ may be determined by multiplying a first $[C_{52}, 0_{12}]$, which is near the leftmost tone, by $\gamma_1^{(40)}$, by multiplying a second $[C_{52}, 0_{12}]$ by $\gamma_2^{(40)}$, by multiplying a third $[C_{52}, 0_{12}]$ by $\gamma_3^{(40)}$, by multiplying a fourth $[C_{52}, 0_{12}]$ by $\gamma_4^{(40)}$, by multiplying a fifth $[C_{52}, 0_{12}]$ by $\gamma_5^{(40)}$, by multiplying a sixth $[C_{52}, 0_{12}]$ by $\gamma_6^{(40)}$, by multiplying a seventh $[C_{52}, 0_{12}]$ by $\gamma_7^{(40)}$, and by multiplying a last $C_{52}$ by $\gamma_8^{(40)}$.

Table 6 shown below discloses $\gamma_k$ for satisfying a PAPR (=1.6747) of a basic STF sequence corresponding to the 40 MHz bandwidth. 128 different types of $\gamma_k$ satisfying the PAPR(=1.6747) may exist.

TABLE 6

| index | $\gamma_1^{(40)}$ | $\gamma_2^{(40)}$ | $\gamma_3^{(40)}$ | $\gamma_4^{(40)}$ | $\gamma_5^{(40)}$ | $\gamma_6^{(40)}$ | $\gamma_7^{(40)}$ | $\gamma_8^{(40)}$ |
|---|---|---|---|---|---|---|---|---|
| 1 | 1 | 1 | 1 | 1i | −1 | 1 | −1 | 1i |
| 2 | 1 | 1 | 1 | −1i | −1 | 1 | −1 | −1i |
| 3 | 1 | 1 | −1 | 1i | −1 | 1 | 1 | 1i |
| 4 | 1 | 1 | −1 | −1i | −1 | 1 | 1 | −i |
| 5 | 1 | 1 | 1i | 1 | 1 | −1 | 1i | −1 |
| 6 | 1 | 1 | 1i | −1 | 1 | −1 | 1i | 1 |
| 7 | 1 | 1 | −1i | 1 | 1 | −1 | −1i | −1 |
| 8 | 1 | 1 | −1i | −1 | 1 | −1 | −1i | 1 |
| 9 | 1 | −1 | 1 | 1i | −1 | −1 | −1 | 1i |
| 10 | 1 | −1 | 1 | −1i | −1 | −1 | −1 | −1i |
| 11 | 1 | −1 | −1 | 1i | −1 | −1 | 1 | 1i |
| 12 | 1 | −1 | −1 | −1i | −1 | −1 | 1 | −1i |
| 13 | 1 | −1 | 1i | 1 | 1 | 1 | 1i | −1 |
| 14 | 1 | −1 | 1i | −1 | 1 | 1 | 1i | 1 |
| 15 | 1 | −1 | −1i | 1 | 1 | 1 | −1i | −1 |
| 16 | 1 | −1 | −1i | −1 | 1 | 1 | −1i | 1 |
| 17 | 1 | 1 | 1 | 1i | 1 | 1 | −1 | 1i |
| 18 | 1 | 1 | 1 | −1i | 1 | 1 | −1 | −1i |
| 19 | 1 | 1 | −1 | 1i | 1 | 1 | 1 | 1i |
| 20 | 1 | 1 | −1 | −1i | 1 | 1 | 1 | −1i |
| 21 | 1 | 1 | 1i | 1 | −1 | −1 | 1i | −1 |
| 22 | 1 | 1 | 1i | −1 | −1 | −1 | 1i | 1 |
| 23 | 1 | 1 | −1i | 1 | −1 | −1 | −1i | −1 |
| 24 | 1 | 1 | −1i | −1 | −1 | −1 | −1i | 1 |
| 25 | 1 | −1 | 1 | 1i | 1 | −1 | −1 | 1i |
| 26 | 1 | −1 | 1 | −1i | 1 | −1 | −1 | −1i |
| 27 | 1 | −1 | −1 | 1i | 1 | −1 | 1 | 1i |
| 28 | 1 | −1 | −1 | −1i | 1 | −1 | 1 | −1i |
| 29 | 1 | −1 | 1i | 1 | −1 | 1 | 1i | −1 |
| 30 | 1 | −1 | 1i | −1 | −1 | 1 | 1i | 1 |
| 31 | 1 | −1 | −1i | 1 | −1 | 1 | −1i | −1 |
| 32 | 1 | −1 | −1i | −1 | −1 | 1 | −1i | 1 |
| 33 | 1 | 1i | 1 | 1 | −1 | 1i | −1 | 1 |
| 34 | 1 | 1i | 1 | −1 | −1 | 1i | −1 | −1 |
| 35 | 1 | 1i | −1 | 1 | −1 | 1i | 1 | 1 |
| 36 | 1 | 1i | −1 | −1 | −1 | 1i | 1 | −1 |
| 37 | 1 | 1i | 1i | 1i | 1 | −1i | 1i | −1i |
| 38 | 1 | 1i | 1i | −1i | 1 | −1i | 1i | 1i |
| 39 | 1 | 1i | −1i | 1i | 1 | −1i | −1i | −1i |
| 40 | 1 | 1i | −1i | −1i | 1 | −1i | −1i | 1i |
| 41 | 1 | −1i | 1 | 1 | −1 | −1i | −1 | 1 |
| 42 | 1 | −1i | 1 | −1 | −1 | −1i | −1 | −1 |
| 43 | 1 | −1i | −1 | 1 | −1 | −1i | 1 | 1 |
| 44 | 1 | −1i | −1 | −1 | −1 | −1i | 1 | −1 |
| 45 | 1 | −1i | 1i | 1i | 1 | 1i | 1i | −1i |
| 46 | 1 | −1i | 1i | −1i | 1 | 1i | 1i | 1i |
| 47 | 1 | −1i | −1i | 1i | 1 | 1i | −1i | −1i |
| 48 | 1 | −1i | −1i | −1i | 1 | 1i | −1i | 1i |
| 49 | −1 | 1i | 1 | 1 | 1 | 1i | −1 | 1 |
| 50 | −1 | 1i | 1 | −1 | 1 | 1i | −1 | −1 |
| 51 | −1 | 1i | −1 | 1 | 1 | 1i | 1 | 1 |
| 52 | −1 | 1i | −1 | −1 | 1 | 1i | 1 | −1 |
| 53 | −1 | 1i | 1i | 1i | −1 | −1i | 1i | −1i |
| 54 | −1 | 1i | 1i | −1i | −1 | −1i | 1i | 1i |
| 55 | −1 | 1i | −1i | 1i | −1 | −1i | −1i | −1i |
| 56 | −1 | 1i | −1i | −1i | −1 | −1i | −1i | 1i |
| 57 | −1 | −1i | 1 | 1 | 1 | −1i | −1 | 1 |
| 58 | −1 | −1i | 1 | −1 | 1 | −1i | −1 | −1 |
| 59 | −1 | −1i | −1 | 1 | 1 | −1i | 1 | 1 |
| 60 | −1 | −1i | −1 | −1 | 1 | −1i | 1 | −1 |
| 61 | −1 | −1i | 1i | 1i | −1 | 1i | 1i | −1i |
| 62 | −1 | −1i | 1i | −1i | −1 | 1i | 1i | 1i |
| 63 | −1 | −1i | −1i | 1i | −1 | 1i | −1i | −1i |
| 64 | −1 | −1i | −1i | −1i | −1 | 1i | −1i | 1i |
| 65 | 1i | 1 | 1 | 1 | 1i | −1 | 1 | −1 |
| 66 | 1i | 1 | 1 | −1 | 1i | −1 | 1 | 1 |
| 67 | 1i | 1 | −1 | 1 | 1i | −1 | −1 | −1 |
| 68 | 1i | 1 | −1 | −1 | 1i | −1 | −1 | 1 |
| 69 | 1i | 1 | 1i | 1i | −1i | 1 | 1i | 1i |
| 70 | 1i | 1 | 1i | −1i | −1i | 1 | 1i | −1i |
| 71 | 1i | 1 | −1i | 1i | −1i | 1 | −1i | 1i |
| 72 | 1i | 1 | −1i | −1i | −1i | 1 | −1i | −1i |

TABLE 6-continued

| index | $\gamma_1^{(40)}$ | $\gamma_2^{(40)}$ | $\gamma_3^{(40)}$ | $\gamma_4^{(40)}$ | $\gamma_5^{(40)}$ | $\gamma_6^{(40)}$ | $\gamma_7^{(40)}$ | $\gamma_8^{(40)}$ |
|---|---|---|---|---|---|---|---|---|
| 73 | 1i | −1 | 1 | 1 | 1i | 1 | 1 | −1 |
| 74 | 1i | −1 | 1 | −1 | 1i | 1 | 1 | 1 |
| 75 | 1i | −1 | −1 | 1 | 1i | 1 | −1 | −1 |
| 76 | 1i | −1 | −1 | −1 | 1i | 1 | −1 | 1 |
| 77 | 1i | −1 | 1i | 1i | −1i | −1 | −1i | 1i |
| 78 | 1i | −1 | 1i | −1i | −1i | −1 | −1i | −1i |
| 79 | 1i | −1 | −1i | 1i | −1i | −1 | 1i | 1i |
| 80 | 1i | −1 | −1i | −1i | −1i | −1 | 1i | −1i |
| 81 | −1i | 1 | 1 | 1 | −1i | −1 | 1 | −1 |
| 82 | −1i | 1 | 1 | −1 | −1i | −1 | 1 | 1 |
| 83 | −1i | 1 | −1 | 1 | −1i | −1 | −1 | −1 |
| 84 | −1i | 1 | −1 | −1 | −1i | −1 | −1 | 1 |
| 85 | −1i | 1 | 1i | 1i | 1i | 1 | −1i | 1i |
| 86 | −1i | 1 | 1i | −1i | 1i | 1 | −1i | −1i |
| 87 | −1i | 1 | −1i | 1i | 1i | 1 | 1i | 1i |
| 88 | −1i | 1 | −1i | −1i | 1i | 1 | 1i | −1i |
| 89 | −1i | −1 | 1 | 1 | −1i | 1 | 1 | −1 |
| 90 | −1i | −1 | 1 | −1 | −1i | 1 | 1 | 1 |
| 91 | −1i | −1 | −1 | 1 | −1i | 1 | −1 | −1 |
| 92 | −1i | −1 | −1 | −1 | −1i | 1 | −1 | 1 |
| 93 | −1i | −1 | 1i | 1i | 1i | −1 | −1i | 1i |
| 94 | −1i | −1 | 1i | −1i | 1i | −1 | −1i | −1i |
| 95 | −1i | −1 | −1i | 1i | 1i | −1 | 1i | 1i |
| 96 | −1i | −1 | −1i | −1i | 1i | −1 | 1i | −1i |
| 97 | 1i | 1i | 1 | 1i | 1i | −1i | 1 | −1i |
| 98 | 1i | 1i | 1 | −1i | 1i | −1i | 1 | 1i |
| 99 | 1i | 1i | −1 | 1i | 1i | −1i | −1 | −1i |
| 100 | 1i | 1i | −1 | −1i | 1i | −1i | −1 | 1i |
| 101 | 1i | 1i | 1i | 1 | −1i | 1i | −1i | 1 |
| 102 | 1i | 1i | 1i | −1 | −1i | 1i | −1i | −1 |
| 103 | 1i | 1i | −1i | 1 | −1i | 1i | 1i | 1 |
| 104 | 1i | 1i | −1i | −1 | −1i | 1i | 1i | −1 |
| 105 | 1i | −1i | 1 | 1i | 1i | 1i | 1 | −1i |
| 106 | 1i | −1i | 1 | −1i | 1i | 1i | 1 | 1i |
| 107 | 1i | −1i | −1 | 1i | 1i | 1i | −1 | −1i |
| 108 | 1i | −1i | −1 | −1i | 1i | 1i | −1 | 1i |
| 109 | 1i | −1i | 1i | 1 | −1i | −1i | −1i | 1 |
| 110 | 1i | −1i | 1i | −1 | −1i | −1i | −1i | −1 |
| 111 | 1i | −1i | −1i | 1 | −1i | −1i | 1i | 1 |
| 112 | 1i | −1i | −1i | −1 | −1i | −1i | 1i | −1 |
| 113 | −1i | 1i | 1 | 1i | −1i | −1i | 1 | −1i |
| 114 | −1i | 1i | 1 | −1i | −1i | −1i | 1 | 1i |
| 115 | −1i | 1i | −1 | 1i | −1i | −1i | −1 | −1i |
| 116 | −1i | 1i | −1 | −1i | −1i | −1i | −1 | 1i |
| 117 | −1i | 1i | 1i | 1 | 1i | 1i | −1i | 1 |
| 118 | −1i | 1i | 1i | −1 | 1i | 1i | −1i | −1 |
| 119 | −1i | 1i | −1i | 1 | 1i | 1i | 1i | 1 |
| 120 | −1i | 1i | −1i | −1 | 1i | 1i | 1i | −1 |
| 121 | −1i | −1i | 1 | 1i | −1i | 1i | 1 | −1i |
| 122 | −1i | −1i | 1 | −1i | −1i | 1i | 1 | 1i |
| 123 | −1i | −1i | −1 | 1i | −1i | 1i | −1 | −1i |
| 124 | −1i | −1i | −1 | −1i | −1i | 1i | −1 | 1 |
| 125 | −1i | −1i | 1i | 1 | 1i | −1i | −1i | 1 |
| 126 | −1i | −1i | 1i | −1 | 1i | −1i | −1i | −1 |
| 127 | −1i | −1i | −1i | 1 | 1i | −1i | 1i | 1 |
| 128 | −1i | −1i | −1i | −1 | 1i | −1i | 1i | −1 |

Figure 7:
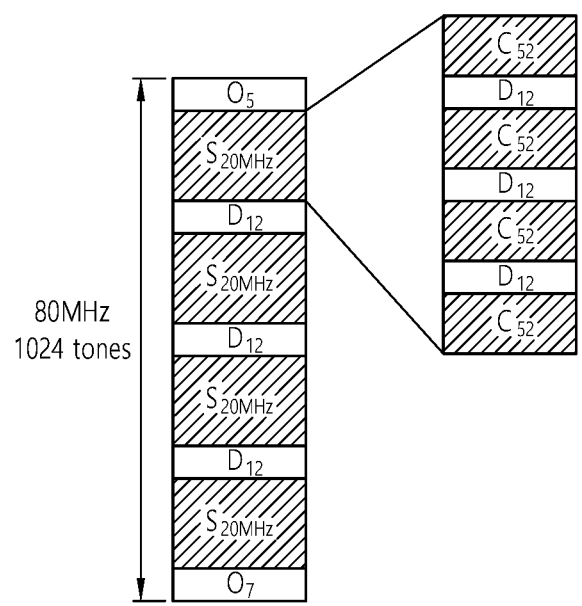
FIG. 7 is a conceptual view illustrating a basic structure of an STF sequence in accordance with a bandwidth size according to an exemplary embodiment of the present invention.

FIG. 7 is a conceptual view illustrating a basic structure of an STF sequence in accordance with a bandwidth size according to an exemplary embodiment of the present invention.

Figure 8:
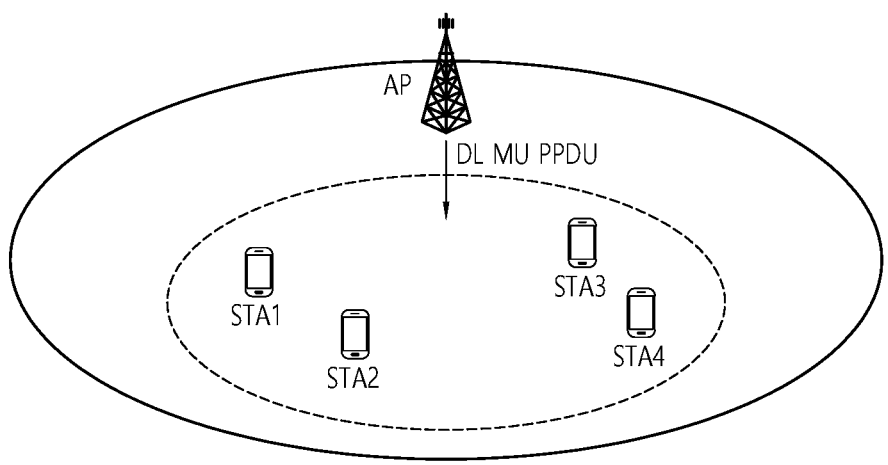
FIG. 8 is a conceptual view illustrating a transmission of a MU PPDU according to an exemplary embodiment of the present invention.
Figure 8:
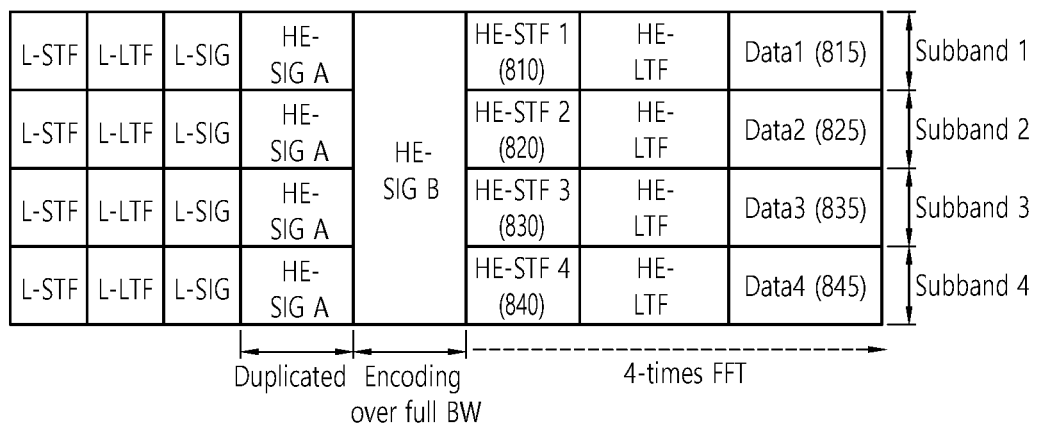

FIG. 7 discloses a structure of another STF sequence on the 80 MHz bandwidth. In FIG. 8, $\gamma_k$ may be applied to a subset unit [$S_{20\ MHz}$, $D_{12}$] of the STF sequence.

Referring to FIG. 7, in the 80 MHz bandwidth, the STF sequence may be defined as shown below in Equation 11.

$$S_{20\ MHz} = [C_{52}, D_{12}, C_{52}, D_{12}, C_{52}, D_{12}, C_{52}]$$

$$S_{20\ MHz\_rotation} = [C_{52} \times \gamma_1^{(80)}, D_{12} \times \gamma_1^{(80)}, C_{52} \times \gamma_2^{(80)}, D_{12} \times \gamma_2^{(80)}, C_{52} \times \gamma_3^{(80)}, D_{12} \times \gamma_3^{(80)}, C_{52} \times \gamma_4^{(80)}]$$

$$S_{80\ MHz} = [0_5, S_{20\ MHz}, D_{12}, S_{20\ MHz}, D_{12}, S_{20\ MHz}, D_{12}, S_{20\ MHz}, 0_7]$$

$$S_{80\ MHz\_rotation}=[0_5, S_{20\ MHz} \times \gamma_5^{(80)}, D_{12} \times \gamma_5^{(80)},$$
$$S_{20\ MHz} \times \gamma_6^{(80)}, D_{12} \times \gamma_6^{(80)}, S_{20\ MHz} \times \gamma_7^{(80)},$$
$$D_{12} \times \gamma_7^{(80)}, S_{20\ MHz} \times \gamma_8^{(80)}, 0_7]$$

OR $$S_{80\ MHz\_rotation}=[0_5, S_{20\ MHz\_rotation} \times \gamma_5^{(80)}, D_{12} \times \gamma_5^{(80)},$$
$$S_{20\ MHz\_rotation} \times \gamma_6^{(80)}, D_{12} \times \gamma_6^{(80)}, S_{20\ MHz\_rotation} \times$$
$$\gamma_7^{(80)}, D_{12} \times \gamma_7^{(80)}, S_{20\ MHz\_rotation} \times \gamma_8^{(80)}, 0_7] \quad \text{<Equation 11>}$$

Referring to Equation 11, in the 20 MHz bandwidth, $\gamma_k(\gamma_1^{(80)} \sim \gamma_4^{(80)})$ may be multiplied in subset units of [$C_{52}$, $D_{12}$] and $C_{52}$ of the STF sequence. $S_{80\ MHz\_rotation}$ may be determined by multiplying a first [$S_{20\ MHz}$ (or $S_{20\ MHz\_rotation}$), $D_{12}$], which is near the leftmost tone, by $\gamma_5^{(80)}$, by multiplying a second [$S_{20\ MHz}$ (or $S_{20\ MHz\_rotation}$), $D_{12}$] by $\gamma_6^{(80)}$, by multiplying a third [$S_{20\ MHz}$ (or $S_{20\ MHz\_rotation}$), $D_{12}$] by $\gamma_7^{(80)}$, and by multiplying a [$S_{20\ MHz}$ (or $S_{20\ MHz\_rotation}$), $D_{12}$] by $\gamma_8^{(80)}$.

Table 7 shown below discloses $\gamma_k$ for satisfying a PAPR (=2.1348) of an STF sequence corresponding to the 40 MHz bandwidth. 4 different types of $\gamma_k$ satisfying the PAPR (=2.1348) may exist.

TABLE 7

| index | $\gamma_1^{(40)}$ | $\gamma_2^{(40)}$ | $\gamma_3^{(40)}$ | $\gamma_4^{(40)}$ | $\gamma_5^{(40)}$ | $\gamma_6^{(40)}$ | $\gamma_7^{(40)}$ | $\gamma_8^{(40)}$ |
|---|---|---|---|---|---|---|---|---|
| 1 | 1 | −1 | −1 | −1 | 1 | 1 | 1 | −1 |
| 2 | 1 | −1 | −1 | −1 | −1 | −1 | −1 | 1 |
| 3 | 1 | −1 | −1 | −1 | 1i | I | i | −1i |
| 4 | 1 | −1 | −1 | −1 | −1i | −i | −i | i |

Additionally, just as when the 40 MHz bandwidth is expanded, a $\gamma_k$ value may be applied based on a subset [C52 D12] of the STF sequence. In case of using this method, this may result in an optimal PAPR performance. Equation 12 shown below discloses a case when the $\gamma_k$ value is applied based on the subset [C52 D12] of the STF sequence.

$$S_{80\ MHz}^{part1}=[C_{52}, D_{12}, C_{52}, D_{12}, C_{52}, D_{12}, C_{52}, D_{12}]$$

$$S_{80\ MHz\_rotation}^{part1}=[C_{52} \times \gamma_1^{(80)}, D_{12} \times \gamma_1^{(80)}, C_{52} \times \gamma_2^{(80)},$$
$$D_{12} \times \gamma_2^{(80)}, C_{52} \times \gamma_3^{(80)}, D_{12} \times \gamma_3^{(80)}, C_{52} \times \gamma_4^{(80)},$$
$$D_{12} \times \gamma_4^{(80)}]$$

$$S_{80\ MHz}^{part2}=[C_{52}, D_{12}, C_{52}, D_{12}, C_{52}, D_{12}, C_{52}, D_{12}]$$

$$S_{80\ MHz\_rotation}^{part2}=[C_{52} \times \gamma_5^{(80)}, D_{12} \times \gamma_5^{(80)}, C_{52} \times \gamma_6^{(80)},$$
$$D_{12} \times \gamma_6^{(80)}, C_{52} \times \gamma_7^{(80)}, D_{12} \times \gamma_7^{(80)}, C_{52} \times \gamma_8^{(80)},$$
$$D_{12} \times \gamma_8^{(80)}]$$

$$S_{80\ MHz}^{part3}=[C_{52}, D_{12}, C_{52}, D_{12}, C_{52}, D_{12}, C_{52}, D_{12}]$$

$$S_{80\ MHz\_rotation}^{part3}=[C_{52} \times \gamma_9^{(80)}, D_{12} \times \gamma_9^{(80)},$$
$$C_{52} \times \gamma_{10}^{(80)}, D_{12} \times \gamma_{10}^{(80)}, C_{52} \times \gamma_{11}^{(80)}, D_{12} \times \gamma_{11}^{(80)},$$
$$C_{52} \times \gamma_{12}^{(80)}, D_{12} \times \gamma_{12}^{(80)}]$$

$$S_{80\ MHz}^{part4}=[C_{52}, D_{12}, C_{52}, D_{12}, C_{52}, D_{12}, C_{52}]$$

$$S_{80\ MHz\_rotation}^{part4}=[C_{52} \times \gamma_{13}^{(80)}, D_{12} \times \gamma_{13}^{(80)},$$
$$C_{52} \times \gamma_{14}^{(80)}, D_{12} \times \gamma_{14}^{(80)}, C_{52} \times \gamma_{15}^{(80)}, D_{12} \times \gamma_{15}^{(80)},$$
$$C_{52} \times \gamma_{16}^{(80)}]$$

$$S_{80\ MHz}=[0_5, S_{80\ MHz}^{part1}, S_{80\ MHz}^{part2}, S_{80\ MHz}^{part3},$$
$$S_{80\ MHz}^{part4}, 0_7]$$

$$S_{80\ MHz\_rotation}=[0_5, S_{80\ MHz\_rotation}^{part1},$$
$$S_{80\ MHz\_rotation}^{part2}, S_{80\ MHz\_rotation}^{part3},$$
$$S_{80\ MHz\_rotation}^{part4}, 0_7]$$

The STF may be determined based on fifteen subsets [$C_{52}$, $D_{12}$] of the STF sequence and a subset $C_{52}$ of the STF sequence. Each of the fifteen subsets [$C_{52}$, $D_{12}$] and subset $C_{52}$ may be multiplied by $\gamma_k(\gamma_1^{(80)} \sim \gamma_{16}^{(80)})$.

FIG. 8 is a conceptual view illustrating a transmission of a MU PPDU according to an exemplary embodiment of the present invention.

Referring to FIG. 8, the AP may transmit a DL MU PPDU to a plurality of STAs based on a transmission based on downlink (DL) multi-user (MU) OFDMA.

The AP may transmit an HE-STF through each of the plurality of subbands. The HE-STF may be generated based on the STF sequences (or basic STF sequence), which are described above in FIG.2 to FIG. 7, while considering the overall (or total) bandwidth size.

STA1 may receive HE-STF1 810, which is transmitted from the AP through subband1 and may then perform synchronization, channel tracking/estimation, and AGC, thereby being capable of decoding data field1 815.

Similarly, STA2 may receive HE-STF2 820, which is transmitted from the AP through subband2 and may then perform synchronization, channel tracking/estimation, and AGC, thereby being capable of decoding data field2 825. STA3 may receive HE-STF2 830, which is transmitted from the AP through subband3 and may then perform synchronization, channel tracking/estimation, and AGC, thereby being capable of decoding data field3 835. And, STA4 may receive HE-STF2 840, which is transmitted from the AP through subband4 and may then perform synchronization, channel tracking/estimation, and AGC, thereby being capable of decoding data field4 845.

By receiving an HE-STF that is generated based on the STF sequence that is disclosed in the exemplary embodiment of the present invention, the channel tracking/estimation, and AGC performances of each of STA1 to STA4 may be enhanced.

Figure 9:
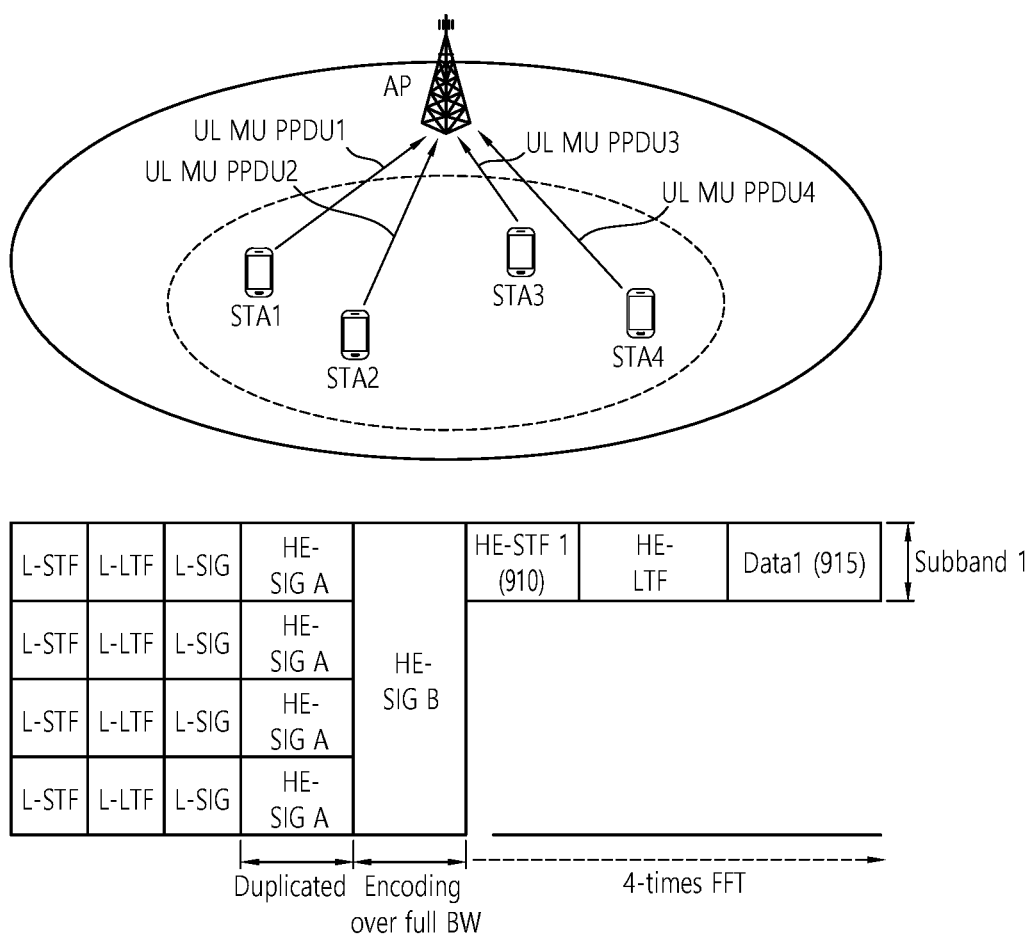
FIG. 9 is a conceptual view illustrating a transmission of a MU PPDU according to an exemplary embodiment of the present invention.

FIG. 9 is a conceptual view illustrating a transmission of a MU PPDU according to an exemplary embodiment of the present invention.

Referring to FIG. 9, a plurality of STAs may transmit a UL MU PPDU to the AP based on UL MU OFDMA. As an example, FIG. 9 only discloses UL MU PPDU1 that is transmitted by STA1.

Each of the plurality of STAs may transmit an HE-STF through each of the plurality of subbands that are allocated by the AP. The HE-STF may be generated based on the STF sequences (or basic STF sequence), which are described above in FIG. 2 to FIG. 7, while considering the overall (or total) bandwidth size.

STA1 may transmit HE-STF1 910 and data field1 915 through subband1, which is allocated by the AR Similarly, STA2 may transmit HE-STF2 and data field2 through subband2, which is allocated by the AP, and STA3 may transmit HE-STF3 and data field3 through subband3, which is allocated by the AP, and STA4 may transmit HE-STF4 and data field4 through subband4, which is allocated by the AP.

The AP may perform AGC based on each of HE-STF1 910~HE-STF4, which are respectively transmitted by each of the plurality of STAs. Additionally, by performing synchronization and channel tracking/estimation based on each of HE-STF1 910~HE-STF4, the AP may decode each of the data field1 910~UL data field4.

Hereinafter, the HE PPDU of the MU PPDU format (DL MU PPDU/UL MU PPDU), which is disclosed in FIG. 8 and FIG. 9, will be described in detail.

In the HE PPDU of the MU PPDU format (DL MU PPDU/UL MU PPDU), the L-STF, the L-LTF, the L-SIG, and the HE-SIG A may be encoded in channel units. The HE-SIG A that is encoded in channel units may be transmitted in a duplicate format within the entire bandwidth.

The receiving STA of the MU PPDU cannot know the bandwidth information corresponding to the HE part that is being transmitted after the non-HE part. Therefore, the HE-SIG A may be generated and transmitted in a duplicate format, and the HE-SIG A may include the bandwidth information corresponding to the HE part.

As described above, the HE-SIG A may include bandwidth information of the HE PPDU, information on the GI being applied to the HE-SIG B and/or the data field, and information related to the HE-SIG B (e.g., HE-SIG B structure information, HE-SIG B size information, and so on).

The duplicate format may be generated based on a copy (replication, duplication) of a field that is being transmitted within a specific band. In case a duplicate format is used, a field of a specific band is replicated (or duplicated), and, then, the replicated (or duplicated) field may be transmitted within multiple bands.

In case the entire bandwidth through which the MU PPDU is being transmitted includes a plurality of channels, the L-STF, the L-LTF, and the L-SIG, which are encoded in channel units, may be transmitted through each of the plurality of channels. Also, in case the entire bandwidth that is allocated to the MU PPDU includes a plurality of channels, the HE-SIG A, which is encoded in channel units, may be duplicated and may then be transmitted through each of the plurality of channels in the duplicate format.

The HE-SIG B may be encoded within the entire bandwidth that is allocated to the MU PPDU and may then be transmitted. For example, in case the entire bandwidth being allocated to the MU PPDU corresponds to 80 MHz, the HE-SIG B may be encoded within the 80 MHz bandwidth and may then be transmitted.

The HE-STF, the HE-LTF, and the data field may be encoded within frequency resources (e.g., subbands), which are respectively allocated to each of the plurality of receiving STAs receiving data, and may then be transmitted. A subband, which corresponds to the encoding unit of the HE-STF, the HE-LTF, and the data field, may correspond to the same unit as a channel and may also correspond to a unit being included in a channel. For example, a channel may have a bandwidth size of 20 MHz, and a subband may have a bandwidth size of 10 MHz (or a bandwidth size of 20 MHz).

Hereinafter, for simplicity in the description, a case when the AP transmits a DL MU PPDU to STA1, STA2, STA3, and STA4 and when subband1, subband2, subband3, and subband4 are respectively allocated to each of STA1, STA2, STA3, and STA4 in order to receive pending downlink data through the DL MU PPDU may be assumed in the exemplary embodiment of the present invention. In this case, the HE-STF, the HE-LTF, and the data field may be encoded in each of subband1, subband2, subband3, and subband4 and may then be respectively transmitted to each of STA1 to STA4.

The procedure of the STA for receiving the DL MU PPDU, which is transmitted from the AP, may be performed as described below. For example, STA1 may receive the L-STF, the L-LTF, the L-SIG, and the HE-SIG A through at least one channel among channel1 to channel4, which receive the DL MU PPDU. The L-STF and the L-LTF may be used for decoding their following fields, which correspond to the L-SIG, the HE-SIG A, and the HE-SIG B. STA1 acquire information on the entire bandwidth (e.g., 80 MHz) through which the HE-SIG B is transmitted, based on the bandwidth information included in the HE-SIG A, and may then perform decoding on the HE-SIG B, which is transmitted within the entire bandwidth. STA1 may acquire information on a frequency resource (e.g., subband1) allocated to STA1, which is included in HE-SIG B, and then STA1 may receive the HE-STF, the HE-LTF, and the data field, which are transmitted within the allocated frequency resource (e.g., subband1).

The HE-STF and the HE-LTF may be used for performing channel estimation for the decoding of the data field. The HE-STF may be generated based on an STF sequence, which is described above in the exemplary embodiment of the present invention.

The HE-SIG B may include information related to the decoding of data being transmitted to the receiving STA (e.g., MIMO information being used for data transmission, MCS information of data, coding information of data, GI duration information of an OFDM symbol for the transmission of the data field (or a field included in the HE part being transmitted after the HE-SIG B), and so on).

Most particularly, the HE-SIG B may include resource allocation information for DL MU OFDMA transmission. For example, the resource allocation information may include identification information of a receiving STA that is to receive the DL MU PPDU, information on the resource being allocated to each of the receiving STAs (e.g., number of subbands being allocated to each of the receiving STAs), and so on. The size of the resource allocation information may be varied in accordance with the number of receiving STAs and the subband being allocated to the receiving STA. Therefore, the length of the HE-SIG B (or the number of OFDM symbols or number of bits that are used for the transmission of the HE-SIG B) may vary in accordance with the number of receiving STAs and the number of subbands being allocated to each of the receiving STAs.

Figure 10:
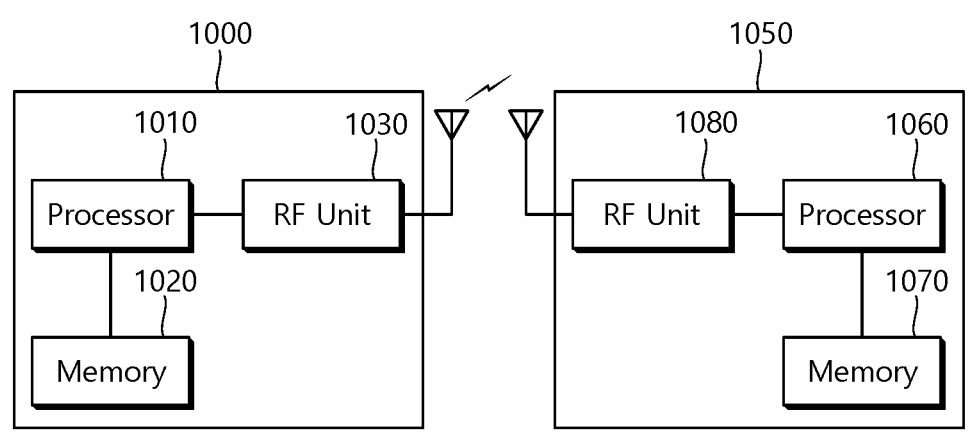
FIG. 10 is a block view illustrating a wireless device to which the exemplary embodiment of the present invention can be applied.

FIG. 10 is a block view illustrating a wireless device to which the exemplary embodiment of the present invention can be applied.

Referring to FIG. 10, as an STA that can implement the above-described exemplary embodiment, the wireless device 1000 may correspond to an AP 1000 or a non-AP station (or STA) 1050.

The AP 1000 includes a processor 1010, a memory 1020, and a radio frequency (RF) unit 1030.

The RF unit 1030 is connected to the processor 1010, thereby being capable of transmitting and/or receiving radio signals.

The processor 1010 implements the functions, processes, and/or methods proposed in the present invention. For example, the processor 1010 may be implemented to perform the operations of the AP according to the above-described exemplary embodiments of the present invention. The processor may perform the operations of the AP, which are disclosed in the exemplary embodiments of FIG. 1 to FIG. 9.

For example, the processor 1010 may be configured to generate a physical protocol data unit (PPDU) that is to be transmitted to each station (STA), and to transmit the PPDU to each of the plurality of stations (STAs) through each of the plurality of subbands within an overlapped time resource based on orthogonal frequency division multiple access (OFDMA). At this point, the PPDU may include a training field, a training field may be generated based on a training sequence, and a training sequence may be designed so that non-null tones for automatic gain control (AGC) can be included in a plurality of tones corresponding to each of the plurality of subbands.

The STA 1050 includes a processor 1060, a memory 1070, and a radio frequency (RF) unit 1080.

The RF unit 1080 is connected to the processor 1060, thereby being capable of transmitting and/or receiving radio signals.

The processor 1060 implements the functions, processes, and/or methods proposed in the present invention. For example, the processor 1060 may be implemented to perform the operations of the STA according to the above-described exemplary embodiments of the present invention. The processor may perform the operations of the STA, which are disclosed in the exemplary embodiments of FIG. 1 to FIG. 9.

For example, the processor 1060 may be configured to receive a PPDU from the AP and to perform AGC based on a training sequence (e.g., STF) being included in the PPDU. Each of the plurality of STAs may perform AGC based on the non-null tones, which are respectively transmitted through each of the plurality of subbands based on OFDMA.

As described above, the training sequence may be diversely used. For example, the training sequence may correspond to $S_{20\ MHz}=[0_5,C_{52},D_{12},C_{52},D_{12},C_{52},D_{12},C_{52},0_7]$ for the 20 MHz bandwidth. Herein, the sequence subset $0_5$ may correspond to five consecutive 0's, and the sequence subset $C_{52}$ may correspond to $$C_{52} = \frac{1}{\sqrt{2}}\{0,0,0,1+j,0,0,0,-1-j,0,0,0,1+j,0,0,0,-1-j,0,0,0,$$
$$-1-j,0,0,0,1+j,0,0,0,0,0,0,-1-j,0,0,0,-1-j,0,$$
$$0,0,1+j,0,0,0,1+j,0,0,0,1+j,0,0,0,1+j\},$$

and the sequence subset $D_{12}$ may correspond to $D_{12}=\{0,0,0,1+j,0,0,0,-1-j,0,0,0,-1-j\}$.

The training sequence to which phase rotation is applied may correspond to $S_{20\ MHz\_rotation}=[0_5,C_{52}\times\gamma_1^{(20)},D_{12}\times\gamma_1^{(20)},C_{52}\times\gamma_2^{(20)},D_{12}\times\gamma_2^{(20)},C_{52}\times\gamma_3^{(20)},D_{12}\times\gamma_3^{(20)},C_{52}\times\gamma_4^{(20)},0_7]$, At this point, each of $Y_1^{(20)}$, $Y_2^{(20)}$, $Y_3^{(20)}$, $Y_4^{(20)}$ for phase rotation may be as shown below in Table 8.

TABLE 8

| Index | $\gamma_1^{(20)}$ | $\gamma_2^{(20)}$ | $\gamma_3^{(20)}$ | $\gamma_4^{(20)}$ |
|---|---|---|---|---|
| 1 | 1 | 1 | 1 | −1 |
| 2 | 1 | −1 | −1 | −1 |
| 3 | −1 | 1 | 1 | 1 |
| 4 | −1 | −1 | −1 | 1 |
| 5 | 1i | 1i | 1i | −1i |
| 6 | 1i | 1i | 1i | −1i |
| 7 | −1i | 1i | 1i | 1i |
| 8 | −1i | −1i | −1i | −1i |

The training sequence for a 40 MHz bandwidth may correspond to $S_{40\ MHz}=[0_5,S'_{20\ MHz},D_{12},S'_{20\ MHz},0_7]$, and $S'_{20\ MHz}$ may correspond to $S'_{20\ MHz}=[C_{52},D_{12},C_{52},D_{12},C_{52},D_{12},C_{52}]$, and the training sequence for a 80 MHz bandwidth may correspond to $S_{80\ MHz}=[0_5,S'_{40\ MHz},D_{12},S'_{40\ MHz},D_{12}S'_{40\ MHz},0_7]$, and $S'_{40\ MHz}$ may correspond to $S'_{40\ MHz}=[S'_{20\ MHz},D_{12},S'_{20\ MHz}]$.

The processor 1010 and 1060 may include an application-specific integrated circuit (ASIC), another chip set, a logical circuit, a data processing device, and/or a converter converting a baseband signal and a radio signal to and from one another. The memory 1020 and 1070 may include a read-only memory (ROM), a random access memory (RAM), a flash memory, a memory card, a storage medium, and/or another storage device. The RF unit 1030 and 1080 may include one or more antennas transmitting and/or receiving radio signals.

When the exemplary embodiment is implemented as software, the above-described method may be implemented as a module (process, function, and so on) performing the above-described functions. The module may be stored in the memory 1020 and 1070 and may be executed by the processor 1010 and 1060. The memory 1020 and 1070 may be located inside or outside of the processor 1010 and 1060 and may be connected to the processor 1010 and 1060 through a diversity of well-known means.

What is claimed is:

1. A method for transmitting a signal in a wireless local area network (LAN), comprising:
   generating, by a transmitting station (STA), a physical protocol data unit (PPDU) including a training field,
   wherein the training field is generated based on a training sequence,
   wherein the training sequence is, determined based $S_{20\ MHz}=[0_5,C_{53},D_{12},C_{52},D_{12},C_{53}D_{12},C_{52},0_7]$ for a 20 MHz bandwidth,
   wherein a sequence subset $0_5$ is determined based on five consecutive zeros and sequence subset $0_7$ is determined based on seven consecutive zeros,
   wherein a sequence subset $C_{52}$ is determined based on $$C_{52} = \frac{1}{\sqrt{2}}\{0,0,0,1+j,0,0,0,-1-j,0,0,0,1+j,0,0,0,-1-j,0,0,0,$$
$$-1-j,0,0,0,1+j,0,0,0,0,0,0,-1-j,0,0,0,-1-j,0,$$
$$0,0,1+j,0,0,0,1+j,0,0,0,1+j,0,0,0,1+j\},$$

wherein a sequence subset $D_{12}$ is determined based on $D_{12}=\{0,0,0,1+j,0,0,0,-1-j,0,0,0-1-j\}$; and
   transmitting, by the transmitting STA, the PPDU to a plurality of receiving STAs based on orthogonal frequency division multiple access (OFDMA).

2. The method of claim 1, wherein the training sequence to which phase rotation is applied is determined based on $S_{20\ MHz\_rotation}=[0_5,C_{52}\times\gamma_1^{(20)},D_{12}\times\gamma_1^{(20)},C_{52}\times\gamma_2^{(20)},D_{12}\times\gamma_2^{(20)},C_{52}\times\gamma_3^{(20)},D_{12}\times\gamma_3^{(20)},C_{52}\times\gamma_4^{(20)},0_7]$,
and wherein each of $Y_1^{(20)}$, $Y_2^{(20)}$, $Y_3^{(20)}$, $Y_4^{(20)}$ for the phase rotation is defined as follows:

| index | $\gamma_1^{(20)}$ | $\gamma_2^{(20)}$ | $\gamma_3^{(20)}$ | $\gamma_4^{(20)}$ |
|---|---|---|---|---|
| 1 | 1 | 1 | 1 | −1 |
| 2 | 1 | −1 | −1 | −1 |
| 3 | −1 | 1 | 1 | 1 |
| 4 | −1 | −1 | −1 | 1 |
| 5 | 1i | 1i | 1i | −1i |
| 6 | 1i | 1i | 1i | −1i |
| 7 | −1i | 1i | 1i | 1i |
| 8 | −1i | −1i | −1i | −1i. |

3. The method of claim 2, wherein the training sequence is determined based on $S_{40\ MHz}=[0_5,S'_{20\ MHz},D_{12},S'_{20\ MHz},0_7]$ for a 40 MHz bandwidth, and $S'_{20\ MHz}$ is determined based on $S'_{20\ MHz}=[C_{52},D_{12},C_{52},D_{12},C_{52},D_{12},C_{52}]$, and wherein the training sequence is determined based on $S_{80\ MHz}=[0_5,S'_{40\ MHz},D_{12},S'_{40\ MHz},0_7]$ for a 80 MHz bandwidth, and $S'_{40\ MHz}$ is determined based on $S'_{40\ MHz}=[S'_{20\ MHz},D_{12},S'_{20\ MHz}]$.

4. A transmitting station (STA) in a wireless local area network (LAN), the transmitting STA comprising:
   a transceiver configured to transmit and/or receive radio signals; and
   a processor being operatively connected to the transceiver,
   wherein the processor is configured to:
   generate a physical protocol data unit (PPDU) including a training field,
   wherein the training field is generated based on a training sequence,
   wherein the training sequence is determined based on $S_{20\ MHz}=[0_5,C_{52},D_{12},C_{52},D_{12},C_{52},D_{12},C_{52},0_7]$ for a 20 MHz bandwidth,
   wherein a sequence subset $0_5$ is determined based on five consecutive zeros and a sequence subset $0_7$ is determined based on seven consecutive zeros,
   wherein a sequence subset $C_{52}$ is determined based on $$C_{52} = \frac{1}{\sqrt{2}}\{0, 0, 1+j, 0, 0, 0, -1-j, 0, 0, 0, 1+j, 0, 0, 0, -1-j.0, 0, 0,$$
$$-1-j, 0, 0, 0, 1+j, 0, 0, 0, 0, 0, 0, 0, -1-j, 0, 0, 0, -1-j, 0,$$
$$0, 0, 1+j, 0, 0, 0, 1+j, 0, 0, 0, 1+j, 0, 0, 0, 1+j\},$$

wherein a sequence subset $D_{12}$ is determined based on $D_{12}=\{0,0,0,1+j,0,0,0,-1-j,\ 0,0,0,-1-j\}$, and transmit the PPDU to a plurality of receiving STAs based on orthogonal frequency division multiple access (OFDMA).

5. The transmitting STA of claim 4, wherein the training sequence to which phase rotation is applied is determined based on $$S_{20\ MHz\_rotation}=[0_5,C_{52}\times\gamma_1^{(20)},D_{12}\times\gamma_1^{(20)},C_{52}\times\gamma_2^{(20)},\\ D_{12}\times\gamma_2^{(20)},C_{52}\times\gamma_3^{(20)},D_{12}\times\gamma_3^{(20)},C_{52}\times\gamma_4^{(20)},0_7],$$

and wherein each of $Y_1^{(20)}, Y_2^{(20)}, Y_3^{(20)}, Y_4^{(20)}$ for the phase rotation is defined as follows:

| index | $\gamma_1^{(20)}$ | $\gamma_2^{(20)}$ | $\gamma_3^{(20)}$ | $\gamma_4^{(20)}$ |
|---|---|---|---|---|
| 1 | 1 | 1 | 1 | −1 |
| 2 | 1 | −1 | −1 | −1 |
| 3 | −1 | 1 | 1 | 1 |
| 4 | −1 | −1 | −1 | 1 |
| 5 | 1i | 1i | 1i | −1i |
| 6 | 1i | 1i | 1i | −1i |
| 7 | −1i | 1i | 1i | 1i |
| 8 | −1i | −1i | −1i | −1i. |

6. The transmitting STA of claim 5, wherein the training sequence is determined based on $S_{40\ MHz}=[0_5,S'_{20\ MHz},D_{12},S'_{20\ MHz},0_7]$ for a 40 MHz bandwidth, and $S'_{20\ MHz}$ is determined based on $S'_{20\ MHz}=[C_{52},D_{12},C_{52},D_{12},C_{52},D_{12},C_{52}]$, and
   wherein the training sequence is determined based on $S_{80\ MHz}=[0_5,S'_{40\ MHz},D_{12},S'_{40\ MHz},0_7]$ for a 80 MHz bandwidth, and $S'_{40\ MHz}$ is determined based on $S'_{40\ MHz}=[S'_{20\ MHz},D_{12},S'_{20\ MHz}]$.

* * * * *